US008772409B2

(12) United States Patent
Kim et al.

(10) Patent No.: US 8,772,409 B2
(45) Date of Patent: *Jul. 8, 2014

(54) COMPOSITIONS FOR SPORTS EQUIPMENT

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,593

(22) Filed: Sep. 14, 2012

(65) Prior Publication Data

US 2013/0012337 A1 Jan. 10, 2013

Related U.S. Application Data

(63) Continuation of application No. 12/612,109, filed on Nov. 4, 2009, now Pat. No. 8,357,756.

(60) Provisional application No. 61/140,523, filed on Dec. 23, 2008.

(51) Int. Cl.
*A63B 37/00* (2006.01)
*A63B 37/12* (2006.01)
*C08L 65/00* (2006.01)
*C08F 277/00* (2006.01)
*C08F 291/02* (2006.01)

(52) U.S. Cl.
USPC ........... 525/193; 525/126; 525/130; 525/216; 525/232; 525/297; 473/371; 473/372; 473/373; 473/374; 473/378; 473/385

(58) Field of Classification Search
None
See application file for complete search history.

(56) References Cited

U.S. PATENT DOCUMENTS

| | | | |
|---|---|---|---|
| 3,804,803 A | 4/1974 | Streck et al. | |
| 3,974,092 A | 8/1976 | Streck et al. | |
| 4,115,475 A | 9/1978 | Foy et al. | |
| 4,123,061 A | 10/1978 | Dusbiber | |
| 4,153,772 A | 5/1979 | Schwesig et al. | |
| 4,183,876 A | 1/1980 | Coran et al. | |
| 4,195,015 A | 3/1980 | Deleens et al. | |
| 4,230,838 A | 10/1980 | Foy et al. | |
| 4,331,786 A | 5/1982 | Foy et al. | |
| 4,332,920 A | 6/1982 | Foy et al. | |
| 4,546,980 A | 10/1985 | Gendreau et al. | |
| 4,726,590 A | 2/1988 | Molitor | |
| 4,728,693 A | 3/1988 | Dröscher et al. | |
| 4,755,552 A | 7/1988 | Jadamus et al. | |
| 4,792,141 A | 12/1988 | Llort | |
| 4,838,556 A | 6/1989 | Sullivan | |
| 4,840,993 A | 6/1989 | Bartz | |
| 4,844,471 A | 7/1989 | Terence et al. | |
| 4,852,884 A | 8/1989 | Sullivan | |
| 4,894,411 A | 1/1990 | Okada et al. | |
| 4,898,223 A | 2/1990 | Botzman et al. | |
| 4,950,826 A | 8/1990 | Zerpner et al. | |
| 4,955,966 A | 9/1990 | Yuki | |
| 5,334,673 A | 8/1994 | Wu | |
| 5,385,776 A | 1/1995 | Maxfield et al. | |
| 5,436,295 A | 7/1995 | Nishikawa et al. | |
| 5,460,367 A | 10/1995 | Horiuchi | |
| 5,948,862 A | 9/1999 | Sano et al. | |
| 5,959,059 A | 9/1999 | Vedula et al. | |
| 5,962,553 A | 10/1999 | Ellsworth | |
| 6,012,991 A | 1/2000 | Kim et al. | |
| 6,100,321 A | 8/2000 | Chen | |
| 6,180,722 B1 | 1/2001 | Dalton et al. | |
| 6,329,458 B1 | 12/2001 | Takesue et al. | |
| 6,426,387 B1 | 7/2002 | Kim | |
| 6,435,986 B1 | 8/2002 | Wu et al. | |
| 6,476,176 B1 | 11/2002 | Wu | |
| 6,485,378 B1 | 11/2002 | Boehm | |
| 6,508,724 B2 | 1/2003 | Dalton | |
| 6,562,906 B2 | 5/2003 | Chen | |
| 6,569,037 B2 | 5/2003 | Ichikawa et al. | |
| 6,582,326 B2 | 6/2003 | Wu et al. | |
| 6,616,552 B2 | 9/2003 | Takesue et al. | |
| 6,635,716 B2 | 10/2003 | Voorheis et al. | |
| 6,692,379 B2 | 2/2004 | Morgan et al. | |
| 6,762,244 B2 | 7/2004 | Rajogopalan et al. | |
| 6,770,360 B2 | 8/2004 | Mientus et al. | |

(Continued)

FOREIGN PATENT DOCUMENTS

JP 62267357 11/1987
JP 63221157 9/1988

(Continued)

OTHER PUBLICATIONS http://www.chemsoc.org/chembytes/ezine/2002/birkett_july02.htm (accessed on Nov. 1, 2006).
http://bppetrochemicals.com (accessed on Nov 1, 2006) (http://bp.com/modularhome.do?categoryId=6110).
http://www.nml.csir.co.za/news/20020711/index1.htm. (accessed on May 29, 2007).
Research disclosure 29703, published in Jan. 1989.
English translation of Notice of Reasons for Rejection from the Japanese Patent Office dated Jan. 10, 2008 in Japanese Patent Application No. 2006-014614.

(Continued)

*Primary Examiner* — David Buttner
(74) *Attorney, Agent, or Firm* — Klarquist Sparkman LLP

(57) ABSTRACT

Compositions comprising the reaction product of:
(a) a polyalkenamer; and
(b) an organic modifier that includes at least one carbon to carbon unsaturated bond and at least one functional group selected from carboxyl, hydroxyl, amino, epoxy, (meth)acrylate, vinyl, ester, isocyanate, carbonyl, urethane, anhydride, or a metal salt thereof.

Also disclosed are golf balls that include (i) a core, (ii) at least one intermediate layer, and (iii) at least one cover layer, wherein at least one of the core, intermediate layer or cover layer includes the polyalkenamer/functionalized organic modifier composition as a majority ingredient.

21 Claims, 2 Drawing Sheets

(56) References Cited

U.S. PATENT DOCUMENTS

| | | |
|---|---|---|
| 6,776,942 B2 | 8/2004 | Kim |
| 6,794,447 B1 | 9/2004 | Kim et al. |
| 6,812,276 B2 | 11/2004 | Yeager |
| 6,835,146 B2 | 12/2004 | Jordan et al. |
| 6,861,474 B2 | 3/2005 | Kim |
| 6,878,075 B2 | 4/2005 | Kim |
| 6,905,423 B2 | 6/2005 | Morgan et al. |
| 6,930,150 B2 | 8/2005 | Kim |
| 6,960,629 B2 | 11/2005 | Voorheis et al. |
| 7,041,769 B2 | 5/2006 | Wu et al. |
| 7,332,533 B2 | 2/2008 | Kim et al. |
| 7,528,196 B2 | 5/2009 | Kim et al. |
| 8,357,756 B2 * | 1/2013 | Kim et al. ............ 525/193 |
| 2001/0005699 A1 | 6/2001 | Morgan et al. |
| 2001/0019971 A1 | 9/2001 | Hayashi et al. |
| 2002/0040111 A1 | 4/2002 | Rajagopalan |
| 2002/0045499 A1 | 4/2002 | Takemura et al. |
| 2003/0119989 A1 | 6/2003 | Ladd et al. |
| 2003/0158312 A1 | 8/2003 | Chen |
| 2003/0224871 A1 | 12/2003 | Kim et al. |
| 2004/0019138 A1 | 1/2004 | Voorheis et al. |
| 2004/0082408 A1 | 4/2004 | Sullivan et al. |
| 2004/0092336 A1 | 5/2004 | Kim et al. |
| 2004/0209708 A1 | 10/2004 | Bulpett et al. |
| 2004/0236030 A1 | 11/2004 | Kim et al. |
| 2004/0248669 A1 | 12/2004 | Kim et al. |
| 2005/0059756 A1 | 3/2005 | Kim et al. |
| 2006/0014898 A1 | 1/2006 | Kim |
| 2006/0166762 A1 | 7/2006 | Kim et al. |
| 2008/0076867 A1 | 3/2008 | Kanz et al. |
| 2008/0090678 A1 | 4/2008 | Kim et al. |
| 2009/0191981 A1 | 7/2009 | Kim et al. |
| 2010/0160079 A1 * | 6/2010 | Kim et al. ............ 473/373 |

FOREIGN PATENT DOCUMENTS

| | | | |
|---|---|---|---|
| JP | 08103515 | * | 4/1996 |
| JP | 2001-218872 | | 8/2001 |
| JP | 2002-65896 A | | 3/2002 |

OTHER PUBLICATIONS

English translation of Notice of Reasons for Rejection from the Japanese Patent Office dated Oct. 22, 2008 in Japanese Patent Application No. 2006-014614.

Gong et al., "Synthesis and Characterization of High Molecular Weight Carboxylated Polybutadiene," *Journal of Polymer Science: Part A: Polymer Chemistry* 27:3129-3138, 1999.

* cited by examiner

COMPOSITIONS FOR SPORTS EQUIPMENT

CROSS REFERENCE TO RELATED APPLICATIONS

This application is a Continuation of U.S. application Ser. No. 12/612,109, filed Nov. 4, 2009, which issued as U.S. Pat. No. 8,357,756 on Jan. 22, 2013, which claims the benefit of U.S. Provisional Application No. 61/140,523, filed Dec. 23, 2008, which are incorporated herein in their entirety.

FIELD

The present disclosure relates to compositions that include polyalkenamer/functionalized organic modifier compositions, and sports equipment (particularly golf balls) that include such compositions.

BACKGROUND

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, three-piece or multi-layered golf balls. One-piece balls are molded from a homogeneous mass of material with a dimple pattern molded thereon. One-piece balls are inexpensive and very durable, but do not provide great distance because of relatively high spin and low velocity. Two-piece balls are made by molding a cover around a solid rubber core. These are the most popular types of balls in use today. In attempts to further modify the ball performance especially in terms of the distance such balls travel and the feel transmitted to the golfer through the club on striking the ball, the basic two piece ball construction has been further modified by the introduction of additional layers between the core and outer cover layer. If one additional layer is introduced between the core and outer cover layer a so called "three-piece ball" results and similarly, if two additional layers are introduced between the core and outer cover layer, a so called "four-piece ball" results, and so on.

Wound balls typically have either a solid rubber, or liquid-filled, center around which many yards of a stretched elastic thread or yarn is wound to form a core. The wound core then is covered with a durable cover material, e.g., an ionomer or other thermoplastic material or a softer cover such as balata or cast polyurethane. Wound balls generally are softer than two-piece balls, and they provide more spin, which enables a skilled golfer to have more control over the ball's flight. In particular, it is desirable for the golfer to be able to impart backspin to the ball, for purposes of controlling its flight and controlling the action of the ball upon landing on the ground. For example, substantial backspin will make the ball stop once it strikes the landing surface instead of bounding forward. The ability to impart backspin onto a golf ball is related to the extent to which the golf ball's cover deforms when it is struck by a golf club. Because conventional wound balls are generally more deformable than are conventional two-piece balls, it is easier to impart spin to wound balls. However, higher spinning wound balls typically travel a shorter distance when struck, as compared to two-piece balls. Moreover, because wound balls generally have a more complex structure, they generally require a longer time to manufacture and are more expensive to produce than are two-piece balls. Golf balls having a two-piece construction generally are most popular with the recreational golfer, because they are relatively durable and provide maximum distance. Two-piece balls have a single solid core, usually formed of a cross-linked rubber, which is encased by a cover. Typically, the solid core is made of polybutadiene, which is chemically cross-linked with peroxide, or sulfur compounds together with co-cross-linking agent, such as zinc diacrylate. The cover of such balls often comprises tough, cut-proof blends of one or more materials known as ionomers, which typically are ethylene/acrylic acid copolymers or ethylene/acrylic acid/acrylate terpolymers in which some or all of the acid groups are neutralized with metal cations. Such ionomers are commercially available under trademarks such as SURLYN®, which are resins sold commercially by DuPont, of Wilmington, Del., or IOTEK®, which is sold commercially by ExxonMobil, of Irving, Tex.

SUMMARY

In one embodiment, disclosed are compositions comprising the reaction product of:
(a) a polyalkenamer; and
(b) an organic modifier that includes at least one carbon to carbon unsaturated bond and at least one functional group selected from carboxyl, hydroxyl, amino, epoxy, (meth)acrylate, vinyl, ester, isocyanate, carbonyl, urethane, anhydride, or a metal salt thereof.

In a further embodiment, disclosed are golf balls that include (i) a core, (ii) at least one intermediate layer, and (iii) at least one cover layer, wherein at least one of the core, intermediate layer or cover layer includes the polyalkenamer/functionalized organic modified composition as a majority ingredient.

BRIEF DESCRIPTION OF THE DRAWINGS

Referring to the drawing in FIG. 1 there is illustrated a golf ball, 1, which comprises a solid center or core, 2, formed as a solid body of the herein described formulation and in the shape of the sphere, an intermediate layer, 3, disposed on the spherical core and an outer cover layer, 4.

Referring to the drawing in FIG. 2 there is illustrated a golf ball, 1, which comprises a solid center or core, 2, formed as a solid body of the herein described formulation and in the shape of the sphere, an inner intermediate layer, 3, disposed on the spherical core, an outer intermediate layer, 4, disposed on the inner intermediate layer, 3, and an outer cover layer, 5.

DETAILED DESCRIPTION

Figure 1:
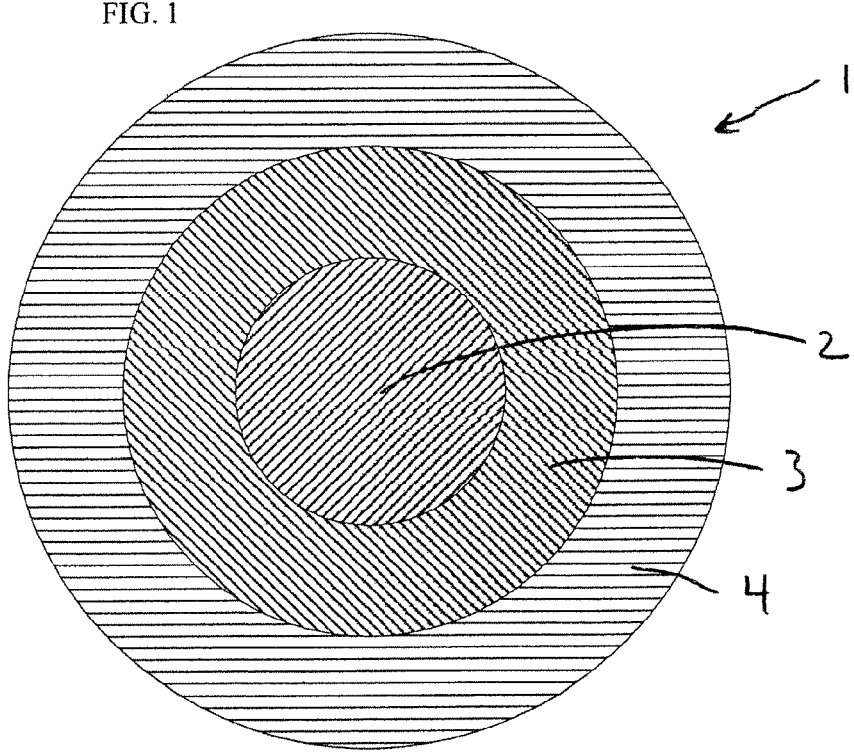
Figure 2:
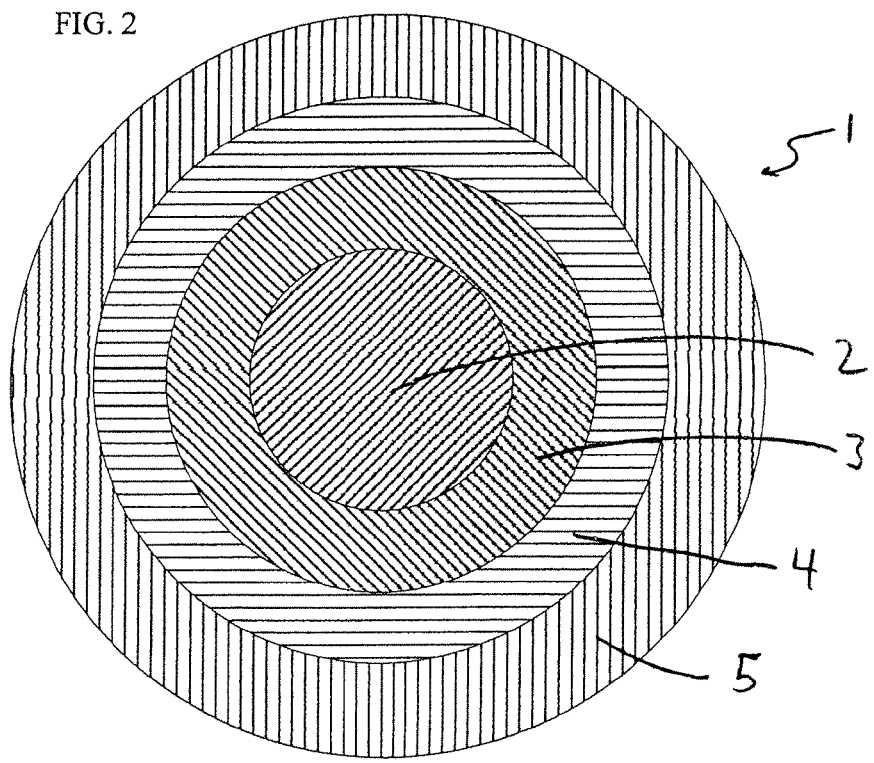

For ease of understanding, the following terms used herein are described below in more detail:

The term "core" refers to the elastic center of a golf ball, which may have a unitary construction. Alternatively the core itself may have a layered construction having a spherical "center" and additional "core layers," which such layers usually being made of the same material as the core center.

The term "cover layer" or "cover" refers to any layer or layers of the golf ball adjacent to, and preferably surrounding (partially surrounding or entirely surrounding), the outermost mantle layer. The term "outer cover layer" refers to the outermost cover layer of the golf ball; this is the layer that is directly in contact with paint and/or ink on the surface of the golf ball and on which the dimple pattern is placed. The term outer cover layer as used herein is used interchangeably with the term "outer cover". In some embodiments, the cover may include two or more layers. In these embodiments, the term "inner cover layer" or "inner cover" refers to any cover layer positioned between the outermost mantle layer and the outer cover layer.

The term "intermediate layer" or "mantle layer" refers to any layer(s) in a golf ball disposed between the core and the cover layer(s). The intermediate layer may be in the shape of a hollow, thin-skinned sphere that may or may not include inward or outward protrusions (e.g., the intermediate layer may be of substantially the same thickness around its entire curvature). An intermediate layer may partially or entirely surround the core. In the case of a ball with two or more intermediate layers, the term "inner mantle" or "inner intermediate layer" refers to the intermediate layer of the ball that is disposed nearest to the core. Again, in the case of a ball with two or more intermediate layers, the term "outer mantle" or "outer intermediate layer" refers to the intermediate layer of the ball that is disposed nearest to the outer cover layer.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymer's molecular weight distribution curve, i.e., the molecular weight distribution curve for the total polymer product shows only a single maximum.

A "high acid ionomer" generally refers to an ionomer resin or polymer that includes more than about 16 wt. %, more particularly more than about 19 wt. %, of unsaturated mono- or dicarboxylic acids units based on the weight of resin or polymer.

The term "hydrocarbyl" includes any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "(meth)acrylic acid copolymers" refers to copolymers of methacrylic acid and/or acrylic acid.

The term "(meth)acrylate" refers to an ester of methacrylic acid and/or acrylic acid.

The term "partially neutralized" refers to an ionomer with a degree of neutralization of less than 100 percent.

"Prepolymer" refers to any material that can be further processed to form a final polymer material of a manufactured golf ball, such as, by way of example and not limitation, a polymerized or partially polymerized material that can undergo additional processing, such as crosslinking.

The term "polyalkenamer" is used interchangeably herein with the term "polyalkenamer rubber" and means a rubbery polymer of one or more cycloalkenes having from 5-20, preferably 5-15, most preferably 5-12 ring carbon atoms. The polyalkenamers may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference.

Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer has a trans content of approximately 80%, however, compounds having other ratios of the cis- and trans-isomeric forms of the polyalkenamer can also be obtained by blending available products for use in making the composition.

The polyalkenamer rubber has a weight average molecular weight (Mw, as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5 to about 70, preferably from about 6 to about 50, more preferably from about from 6.5 to about 50%, even more preferably from about from 7 to about 45%, More preferably, the polyalkenamer rubber is a polymer prepared by polymerization of cyclooctene to form a trans-polyoctenamer rubber as a mixture of linear and cyclic macromolecules.

The polyalkenamer rubbers used in the present disclosure exhibit excellent melt processability above their sharp melting temperatures and exhibit high miscibility with various rubber additives as a major component without deterioration of crystallinity which in turn facilitates injection molding. Thus, unlike synthetic rubbers typically used in golf ball preparation, injection molded parts of polyalkenamer-based compounds can be prepared which, in addition, can also be partially or fully crosslinked at elevated temperature. The crosslinked polyoctenamer compounds are highly elastic, and their mechanical and physical properties can be easily modified by adjusting the formulation.

As used herein, the term "injection moldable" as applied to the polyalkenamer rubber or polyalkenamer/polyamide compositions used as described herein refers to a material amenable to use in injection molding apparatus designed for use with typical thermoplastic resins. In one example, the term injection moldable composition as applied to the uncrosslinked polyalkenamer rubbers used in the present disclosure means compositions having a viscosity using a Dynamic Mechanical Analyzer (DMA) and ASTM D4440 at 200° C. of less than about 5,000 Pa-sec, preferably less than about 3,000 Pa-sec, more preferably less than about 2,000 Pa-sec and even more preferably less than about 1,000 Pa-sec. and a storage modulus (G') at 1 Hz measured using a Dynamic Mechanical Analyzer (DMA) and ASTM D4065, and ASTM D4440, at 25° C., and 1 Hz of greater than about $1 \times 10^7$ dyn/cm$^2$, preferably greater than about $1.5 \times 10^7$ dyn/cm$^2$, more preferably greater than about $1 \times 10^8$ dyn/cm$^2$, and most preferably greater than about $2 \times 10^8$ dyn/cm$^2$.

The term "polyurea" as used herein refers to materials prepared by reaction of a diisocyanate with a polyamine.

The term "polyurethane" as used herein refers to materials prepared by reaction of a diisocyanate with a polyol.

A "specialty propylene elastomer" includes a thermoplastic propylene-ethylene copolymer composed of a majority amount of propylene and a minority amount of ethylene. These copolymers have at least partial crystallinity due to adjacent isotactic propylene units. Although not bound by any theory, it is believed that the crystalline segments are physical crosslinking sites at room temperature, and at high temperature (i.e., about the melting point), the physical crosslinking is removed and the copolymer is easy to process. According to one embodiment, a specialty propylene elastomer includes at least about 50 mole % propylene comonomer. Specialty propylene elastomers can also include functional groups such as maleic anhydride, glycidyl, hydroxyl, and/or carboxylic acid. Suitable specialty propylene elastomers include propylene-ethylene copolymers produced in the presence of a metallocene catalyst. More specific examples of specialty propylene elastomers are illustrated below.

A "terpolymeric ionomer" generally refers to ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and Y is a softening comonomer.

A "thermoplastic" is generally defined as a material that is capable of softening or melting when heated and of hardening again when cooled. Thermoplastic polymer chains often are not cross-linked or are lightly crosslinked using a chain extender, but the term "thermoplastic" as used herein may refer to materials that initially act as thermoplastics, such as during an initial extrusion process or injection molding process, but which also may be crosslinked, such as during a compression molding step to form a final structure.

A "thermoset" is generally defined as a material that crosslinks or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" refers to a material prepared by reaction of a prepared by reaction of a diisocyanate with a polyol, and optionally addition of a chain extender.

The term "thermoplastic polyurea" refers to a material prepared by reaction of a prepared by reaction of a diisocyanate with a polyamine, with optionally addition of a chain extender.

The term "thermoset polyurethane" refers to a material prepared by reaction of a diisocyanate with a polyol, and a curing agent.

The term "thermoset polyurea" refers to a material prepared by reaction of a diisocyanate with a polyamine, and a curing agent.

A "urethane prepolymer" is the reaction product of diisocyanate and a polyol.

A "urea prepolymer" is the reaction product of a diisocyanate and a polyamine.

The term "unimodal polymer" refers to a polymer comprising one main fraction and more specifically to the form of the polymer's molecular weight distribution curve, i.e., the molecular weight distribution curve for the total polymer product shows only a single maximum.

The above term descriptions are provided solely to aid the reader, and should not be construed to have a scope less than that understood by a person of ordinary skill in the art or as limiting the scope of the appended claims.

The singular terms "a," "an," and "the" include plural referents unless context clearly indicates otherwise. The word "comprises" indicates "includes." It is further to be understood that all molecular weight or molecular mass values given for compounds are approximate, and are provided for description. The materials, methods, and examples are illustrative only and not intended to be limiting. Unless otherwise indicated, description of components in chemical nomenclature refers to the components at the time of addition to any combination specified in the description, but does not necessarily preclude chemical interactions among the components of a mixture once mixed.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc., are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

A. Polyalkenamer/Functionalized Organic Modifier Compositions

The organic modifier includes at least one carbon to carbon unsaturated bond and is functionalized with at least one moiety selected from carboxyl, hydroxyl, amino, epoxy, (meth)acrylate, vinyl, ester, isocyanate, carbonyl, urethane, anhydride, or a metal salt thereof, in all cases the functionality can occur either at terminal positions or occur pendant along the polymer backbone, or any and all combinations thereof. In particular embodiments, the functionalized organic modifier is based on a polyolefin. For example, the organic modifier may be based on a butadiene or isoprene polymer such as butadiene homopolymer, isoprene homopolymer, butadiene-acrylonitrile copolymer, butadiene-styrene copolymer, isoprene-styrene copolymer, butadiene-isoprene copolymer, isoprene-acrylonitrile copolymer, acrylonitrile-butadiene-styrene terpolymer or a urethane-containing unsaturated polymer.

Illustrative examples include carboxyl terminated butadiene polymers commercially available from Emerald Performance Materials under the tradenames 2000X162, 1300X31, 1300X8, 1300X13, 1300X9, 1300X18 and from Sartomer under the tradenames Poly bd 45CT, 2000CT or 3000CT. In one embodiment, the polymeric modifier is a carboxyl terminated butadiene polymer (optionally copolymerized with acrylonitrile) wherein the acrylonitrile content ranges from 0% to 30 wt %, and acid number of 10 to 50, and a molecular weight ($M_n$) of 1,000 to 15,000. Additional examples include amine terminated butadiene polymers commercially available from Emerald Performance Materials under the tradenames 1300X21, 1300X16, 1300X45, 1300X42 or 1300X35, hydroxyl terminated butadiene polymers commercially available from Sartomer under the tradenames Poly bd R-45HTLO, R-20LM, LF1, LF2, LF3, 600E, 605E, Krasol LBH2000, LBH-P2000, LBH 3000, LBH-P 3000, LBH 5000, LBH10000, LBH-P 5000, LBH-P 10000, HLBH-P 2000, HLBH-P 3000 or LBH 2040, isocyanate terminated butadiene polymers commercially available from Sartomer under the tradenames Krasol NN22, NN23, NN25, LBD2000 or LBD 3000. Other examples include liquid isoprene rubbers which are functionalized with carboxyl groups, amino groups, amido groups, or hydroxyl groups with the functionality occurring either at terminal positions or pendant along the polymer backbone. These functionalized isoprene rubbers may optionally also be hydrogenated. Examples of such hydrogenated liquid isoprene rubbers include LIR-200 and LIR 290, LIR 403 and LIR 410 which are functionalized with maleic anhydride and carboxyl groups, respectively, all of which are commercially available from Mitsubishi International Corp and Septon Co. Other examples include urethane containing unsaturated polymers available from Sartomer under the tradenames Polybd 2035TPU, 7840TPU. In one embodiment, the organic modifier is a urethane containing butadiene polymer wherein the butadiene unit content ranges from 50 to 80 wt %. According to one approach, the isocyanate terminated materials such as prepolymer, monomeric diisocyanate, polymeric diisocyanate or polyisocyanate before and after blending with polyalkenamer can be added into urethane containing unsaturated polymers. Adding isocyanate groups into the system causes the reaction between isocyanate and urethane linkage to form a crosslinked structure.

In particular embodiments, the functionalizing moiety is a carboxylic acid or a metal salt thereof (e.g., —C(O)O-(M)$^+$). M may be any metal cation, such as those used for ionomer neutralization. Illustrative examples include lithium, calcium, zinc, sodium, potassium, magnesium, nickel, manganese, titanium, barium, tin, zirconium, or mixtures thereof. The metal cation may be obtained from the acetate, oxide or hydroxide salts thereof.

According to one approach, the carboxyl-functionalized modifier can be reacted with a metal cation-donating agent so that the metal cation is introduced into the structure of the polyolefin. For example, the carboxylic acid groups of the modifier may be neutralized by a base with metal cations to form metal salts. The metal cations include Li$^+$, Na$^+$, K$^+$, Zn$^{2+}$, Ca$^{2+}$, Co$^{2+}$, Ni$^{2+}$, Cu$^{2+}$, Pb$^{2+}$, and Mg$^{2+}$, with the Li$^+$, Na$^+$, Ca$^{2+}$, Zn$^{2+}$, and Mg$^{2+}$ being preferred. The basic metal ion salts include those of for example formic acid, acetic acid, nitric acid, and carbonic acid, hydrogen carbonate salts, oxides, hydroxides, and alkoxides. The metal salt-containing organic modifier then is reacted with the polyalkenamer resulting in a crosslinked ionomer.

In one particular embodiment, the organic modifier can be mixed with the polyalkenamer before neutralization and then the carboxyl moiety of the modifier can be neutralized by the above-described metal cation or metal ion salts to form metal salt in the blend. The ionic cluster-containing blend system can then react between the unsaturated chains via free radical initiation to provide a crosslinked ionomer.

According to another approach, the metal cation or metal ion salts can be mixed into an inert carrier prior to adding the organic modifier to the blend system for neutralization. The carrier for metal cation or metal ion salts can be any suitable thermoplastic polymer. This masterbatch form of metal cation or metal salts is easy to handle and can be added by dry blending method.

The ionic crosslinked structure can provide mechanical properties that are significantly different compared to the un-modified polyalkenamer. For example, the polyalkenamer and functionalized organic modifier can be blended together and formed into a desired shape (i.e., the blend is an uncured or "green" state). The shaped blend then can be subjected to curing conditions to crosslink the molecular structure and form a solid shape (e.g., a solid sphere or a mantle or cover layer on a golf ball). The inventive compositions disclosed herein can achieve relatively higher elasticity via introduction of the ionic groups and excellent shear durability resulting from the crosslinked structure.

Although not bound by any theory, it is believed that the organic modifier can form a crosslinked structure between individual polyalkenamer molecules by reacting with the unsaturated carbons (i.e., the double bonds) present in the polyalkenamer. In addition, unsaturated chain in the functionalized modifier can participate to form a crosslinked structure by reacting with polyalkenamer.

The polyalkenamer/functionalized organic modifier initial blend composition used to prepare the crosslinked composition may contain from about 1 to about 90 wt %, preferably from about 2 to about 80 wt %, more preferably from about 5 to 70 wt %, and even more preferably from about 10 to 60 wt % (based on the total polymeric amount in the blend composition) of one or more polyalkenamer polymers, particularly polyalkenamers of a cycloalkene having from 5-20, preferably 5-15, and most preferably 5-12 ring carbon atoms. The polyalkenamers may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference.

In further embodiments, the polyalkenamer/functionalized organic modifier composition is the majority ingredient of the material used to form at least one structural component (e.g., the core or the inner cover layer) of the golf ball. As used herein "majority ingredient" means that the polyalkenamer/functionalized organic modifier composition is present in an amount of at least about 50 wt %, particularly at least 60 wt %, and more particularly at least 80 wt %, based on the total weight of all the ingredients in the material.

B. Crosslinking Agents

Any crosslinking or curing system typically used for crosslinking may be used to crosslink the polyalkenamer/functionalized organic modifier composition such as, for example, applying thermal energy, e-beam, and/or UV-radiation. Satisfactory crosslinking systems are based on sulfur-, peroxide-, azide-, maleimide- or resin-vulcanization agents, which may be used in conjunction with a vulcanization accelerator. Examples of satisfactory crosslinking system components are zinc oxide, sulfur, organic peroxide, zinc peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide.

More preferable cross-linking agents include peroxides, sulfur compounds, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the disclosed compositions can be brought about by applying thermal energy, shear, irradiation (e.g., ultra violet-active agents or electron beam-active agents), reaction with other chemicals, or any combination of these. Both homolytically and heterolytically decomposed peroxide can be used. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl) peroxide.

The cross-linking agents can be blended in total amounts of about 0.01 part to about 5 parts, more preferably about 0.05 part to about 4 parts, and most preferably about 0.1 part to about 2 parts, by weight of the cross-linking agents per 100 parts by weight of the polymer-containing composition.

In a further embodiment, the cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the polymer-containing composition.

Each peroxide cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hour has a decomposition temperature of 138° C. and 2,5-dimethyl-2,5-di-(t-butylperoxy)hexyne-3 at $t_{1/2}$=0.1 hour has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the polymer-containing composition to radiation also can serve as a cross-linking agent. Radiation can be applied to the polymer-containing composition by any known method, including using microwave or gamma radiation, or an electron beam device. Additives may also be used to improve radiation-induced crosslinking of the polymer-containing composition.

C. Co-Cross-Linking Agent

The polymer containing-composition may also be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in the polymer-containing composition either as a preformed metal salt, or by introducing an α,β-unsaturated carboxylic acid and a metal oxide or hydroxide into the polymer-containing composition, and allowing them to react to form the metal salt. The unsaturated carboxylic acid metal salt can be blended in any desired amount, but preferably in amounts of about 1 part to about 100 parts by weight of the unsaturated carboxylic acid per 100 parts by weight of the polymer-containing composition.

D. Peptizer

The polymer-containing composition may also incorporate one or more of the so-called "peptizers".

The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, cesium and zinc salts of the above-mentioned thiophenols and thiocarboxylic acids, with the zinc salt of pentachlorothiophenol being most preferred. Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, ($R_1S$—$SR_2$), etc.; and combinations of functional groups. Such peptizers are more fully disclosed in copending U.S. Application No. 60/752, 475 filed on Dec. 20, 2005 in the name of Hyun Kim et al, the entire contents of which are herein incorporated by reference. A most preferred example is a pyridine peptizer that also includes a chlorine functional group and a thiol functional group such as 2,3,5,6-tetrachloro-4-pyridinethiol (TCPT) and its metal salt including sodium, potassium, lithium, magnesium calcium, barium, cesium, and zinc.

The peptizer, if employed in the golf balls, is present in an amount of from about 0.01 to about 10, preferably of from about 0.05 to about 7, more preferably of from about 0.1 to about 5 parts by weight per 100 parts by weight of the polymer-containing composition.

E. Accelerators

The polymer-containing composition can also comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook: 13$^{th}$ Edition* (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The polymer-containing composition can further incorporate from about 0.01 part to about 10 parts by weight of the accelerator per 100 parts by weight of the polymer-containing composition. More preferably, the ball composition can further incorporate from about 0.02 part to about 5 parts, and most preferably from about 0.03 part to about 1.5 parts, by weight of the accelerator per 100 parts by weight of the polymer.

F. Polymer Components

The polyalkenamer/functionalized organic modifier composition used in the core, outer cover layer and/or one or more intermediate layers of a golf ball may be further blended with additional polymers prior to molding. Also, any of the core, outer cover layer and/or one or more mantle layers of the balls, if not containing the polylalkenamer/functionalized organic modifier composition, may comprise one or more of the following additional polymers.

Such polymers include synthetic and natural rubbers, thermoset polymers such as thermoset polyurethanes and thermoset polyureas, as well as thermoplastic polymers including thermoplastic elastomers such as unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyesters, copolyesters, polyamides, copolyamides, polycarbonates, polyolefins, polyphenylene oxide, polyphenylene sulfide, diallyl phthalate polymer, polyimides, polyvinyl chloride, polyamide-ionomer, polyurethane-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane and any and all combinations thereof. One example is Paraloid EXL 2691A which is a methacrylate-butadiene-styrene (MBS) impact modifier available from Rohm & Haas Co.

More particularly, the synthetic and natural rubber polymers may include the traditional rubber components used in golf ball applications including, both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2. The polybutadiene rubbers have a Mooney viscosity ($ML_{1+4}$ (100° C.)) of from about 20 to about 80, preferably from about 30 to about 70, even more preferably from about 30 to about 60, most preferably from about 35 to about 50. The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

Examples of 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls are sold under the trade names RB810, RB820, and RB830 by JSR Corporation of Tokyo, Japan. These have more than 90% of 1,2 bonds, a mean molecular weight of approximately 120,000, and crystallinity between about 15% and about 30%.

Examples of olefinic thermoplastic elastomers include metallocene-catalyzed polyolefins, ethylene-octene copolymer, ethylene-butene copolymer, and ethylene-propylene copolymers all with or without controlled tacticity as well as blends of polyolefins having ethyl-propylene-non-conjugated diene terpolymer, rubber-based copolymer, and dynamically vulcanized rubber-based copolymer. Examples of these include products sold under the trade names SANTOPRENE, DYTRON, VISAFLEX, and VYRAM by Advanced Elastomeric Systems of Houston, Tex., and SARLINK by DSM of Haarlen, the Netherlands.

Examples of rubber-based thermoplastic elastomers include multiblock rubber-based copolymers, particularly those in which the rubber block component is based on butadiene, isoprene, or ethylene/butylene. The non-rubber repeating units of the copolymer may be derived from any suitable monomers, including meth(acrylate) esters, such as methyl methacrylate and cyclohexylmethacrylate, and vinyl arylenes, such as styrene. Examples of styrenic copolymers are resins manufactured by Kraton Polymers (formerly of Shell Chemicals) under the trade names KRATON D (for styrene-butadiene-styrene and styrene-isoprene-styrene types) and KRATON G (for styrene-ethylene-butylene-styrene and styrene-ethylene-propylene-styrene types) and Kuraray under the trade name SEPTON. Examples of randomly distributed styrenic polymers include paramethylstyrene-isobutylene (isobutene) copolymers developed by ExxonMobil Chemical Corporation and styrene-butadiene random copolymers developed by Chevron Phillips Chemical Corp.

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

Examples of other thermoplastic elastomers suitable as additional polymer components include those having functional groups, such as carboxylic acid, maleic anhydride, glycidyl, norbornene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan. Other examples of these include: maleic anhydride functionalized triblock copolymer consisting of polystyrene end blocks and poly (ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by ElfAtochem of Puteaux, France.

Another example of a polymer for making any of the mantle layers or cover layer is blend of a polyamide (which may a polyamide as described above) with a functional polymer modifier of the polyamide. The functional polymer modifier of the polyamide can include copolymers or terpolymers having a glycidyl group, hydroxyl group, maleic anhydride group or carboxylic group, collectively referred to as functionalized polymers. These copolymers and terpolymers may comprise an $\alpha$-olefin. Examples of suitable $\alpha$-olefins include ethylene, propylene, 1-butene, 1-pentene, 3-methyl-1-butene, 1-hexene, 4-methyl-1-petene, 3-methyl-1-pentene, 1-octene, 1-decene-, 1-dodecene, 1-tetradecene, 1-hexadecene, 1-octadecene, 1-eicocene, 1-docomer, 1-tetracocene, 1-hexacocene, 1-octacocene, and 1-triacontene. One or more of these $\alpha$-olefins may be used.

Examples of suitable glycidyl groups in copolymers or terpolymers in the polymeric modifier include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5 diglyxidylcarboxylate, cyclohexene-4-glycidyl carobxylate, 5-norboenene-2-methyl-2-glycidyl carboxylate, and endocis-bicyclo(2,2,1)-5-heptene-2,3-diglycidyl dicarboxylate. These polymers having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers.

Examples of suitable terpolymers having a glycidyl group include LOTADER AX8900 and AX8920, marketed by Atofina Chemicals, ELVALOY marketed by E.I. Du Pont de Nemours & Co., and REXPEARL marketed by Nippon Petrochemicals Co., Ltd. Additional examples of copolymers comprising epoxy monomers and which are suitable for use within the scope of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within the scope of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Atofina Chemicals; EXXELOR VA1803, a maleic anyhydride-modified ethylene-propylene copolymer having a maleic anyhydride content of 0.7% by weight, marketed by Exxon Chemical Co.; and KRATON FG 1901X, a maleic anhydride functionalized triblock copolymer having polystyrene endblocks and poly(ethylene/butylene) midblocks, marketed by Shell Chemical.

Preferably the functional polymer component is a maleic anhydride grafted polymers preferably maleic anhydride grafted polyolefins (for example, Exxellor VA1803).

Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block.

Other preferred materials suitable for use as additional polymers in the presently disclosed compositions include polyester thermoplastic elastomers marketed under the tradename SKYPEL™ by SK Chemicals of South Korea, or diblock or triblock copolymers marketed under the tradename SEPTON™ by Kuraray Corporation of Kurashiki, Japan, and KRATON™ by Kraton Polymers Group of Companies of Chester, United Kingdom. For example, SEPTON HG 252 is a triblock copolymer, which has polystyrene end blocks and a hydrogenated polyisoprene midblock and has hydroxyl groups at the end of the polystyrene blocks. HG-252 is commercially available from Kuraray America Inc. (Houston, Tex.).

Additional other polymer components include polyalkenamers as described, for example, in US-2006-0166762-A1, which is incorporated herein by reference in its entirety. Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

If a polyalkenamer rubber is present, the polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer has a trans content of approximately 80%, however, compounds having other ratios of the cis- and trans-isomeric forms of the polyalkenamer can also be obtained by blending available products for use in making the composition.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5 to about 70, preferably from about 6 to about 50, more preferably from about from 6.5 to about 50%, even more preferably from about from 7 to about 45%, More preferably, the polyalkenamer rubber is a polymer prepared by polymerization of cyclooctene to form a trans-polyoctenamer rubber as a mixture of linear and cyclic macromolecules.

A further example of a polymer is a specialty propylene elastomer as described, for example, in US 2007/0238552 A1, and incorporated herein by reference in its entirety. A specialty propylene elastomer includes a thermoplastic propylene-ethylene copolymer composed of a majority amount of propylene and a minority amount of ethylene. These copolymers have at least partial crystallinity due to adjacent isotactic propylene units. Although not bound by any theory, it is believed that the crystalline segments are physical crosslinking sites at room temperature, and at high temperature (i.e., about the melting point), the physical crosslinking is removed and the copolymer is easy to process. According to one embodiment, a specialty propylene elastomer includes at least about 50 mole % propylene co-monomer. Specialty propylene elastomers can also include functional groups such as maleic anhydride, glycidyl, hydroxyl, and/or carboxylic acid. Suitable specialty propylene elastomers include propylene-ethylene copolymers produced in the presence of a metallocene catalyst. More specific examples of specialty propylene elastomers are illustrated below. Specialty propylene elastomers are commercially available under the tradename VISTAMAXX from ExxonMobil Chemical.

Another example of an additional polymer component includes the thermoplastic polyurethanes, which are the reaction product of a diol or polyol and an isocyanate, with or without a chain extender. Isocyanates used for making the urethanes encompass diisocyanates and polyisocyanates. Examples of suitable isocyanates include the following: trimethylene diisocyanate, tetramethylene diisocyanate, pentamethylene diisocyanate, hexamethylene diisocyanate, ethylene diisocyanate, diethylidene diisocyanate, propylene diisocyanate, butylene diisocyanate, bitolylene diisocyanate, tolidine isocyanate, isophorone diisocyanate, dimeryl diisocyanate, dodecane-1,12-diisocyanate, 1,10-decamethylene diisocyanate, cyclohexylene-1,2-diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis (phenyl isocyanate), 1-methyl-2,4-cyclohexane diisocyanate, 1-methyl-2,6-cyclohexane diisocyanate, 1,3-bis(isocyanatomethyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis (isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4, 4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, meta-xylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianisidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, polybutylene diisocyanate, isocyanurate modified compounds, and carbodiimide modified compounds, as well as biuret modified compounds of the above polyisocyanates. Each isocyanate may be used either alone or in combination with one or more other isocyanates. These isocyanate mixtures can include triisocyanates, such as biuret of hexamethylene diisocyanate and triphenylmethane triisocyanate, and polyisocyanates, such as polymeric diphenylmethane diisocyanate.

Polyols used for making the polyurethane in the copolymer include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly (diethylene adipate) (PDA), polypropylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), p-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. A polyether polyol may be used either alone or in a mixture.

Polycarbonate polyol is obtained by the condensation of a known polyol (polyhydric alcohol) with phosgene, chloroformic acid ester, dialkyl carbonate or diallyl carbonate. A particularly preferred polycarbonate polyol contains a polyol component using 1,6-hexanediol, 1,4-butanediol, 1,3-butanediol, neopentylglycol or 1,5-pentanediol. A polycarbonate polyol can be used either alone or in a mixture.

Polybutadiene polyol includes liquid diene polymer containing hydroxyl groups, and an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant. A polybutadiene polyol can be used either alone or in a mixture.

As stated above, the urethane also may incorporate chain extenders. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Suitable polyamines that may be used as chain extenders include primary, secondary and tertiary amines; polyamines have two or more amines as functional groups. Examples of these include: aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as 4,4'-methylene bis-2-chloroaniline, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol. Aromatic diamines have a tendency to provide a stiffer product than aliphatic or cycloaliphatic diamines. A chain extender may be used either alone or in a mixture.

Polyurethanes or polyureas typically are prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

In addition, although depicted as discrete component packages as above, it is also possible to control the degree of crosslinking, and hence the degree of thermoplastic or thermoset properties in a final composition, by varying the stoichiometry not only of the diisocyanate-to-chain extender or curing agent ratio, but also the initial diisocyanate-to-polyol or polyamine ratio. Of course in the prepolymer process, the initial diisocyanate-to-polyol or polyamine ratio is fixed on selection of the required prepolymer.

Finally, in addition to discrete thermoplastic or thermoset materials, it also is possible to modify a thermoplastic polyurethane or polyurea composition by introducing materials in the composition that undergo subsequent curing after molding the thermoplastic to provide properties similar to those of a thermoset. For example, Kim in U.S. Pat. No. 6,924,337, the entire contents of which are hereby incorporated by reference, discloses a thermoplastic urethane or urea composition optionally comprising chain extenders and further comprising a peroxide or peroxide mixture, which can then undergo post curing to result in a thermoset.

Also, Kim et al. in U.S. Pat. No. 6,939,924, the entire contents of which are hereby incorporated by reference, discloses a thermoplastic urethane or urea composition, optionally also comprising chain extenders, that is prepared from a diisocyanate and a modified or blocked diisocyanate which unblocks and induces further cross linking post extrusion. The modified isocyanate preferably is selected from the group consisting of: isophorone diisocyanate (IPDI)-based uretdione-type crosslinker; a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethylpyrazole modified isocyanate; or mixtures of these.

Finally, Kim et al. in U.S. Pat. No. 7,037,985 B2, the entire contents of which are hereby incorporated by reference, discloses thermoplastic urethane or urea compositions further comprising a reaction product of a nitroso compound and a diisocyanate or a polyisocyanate. The nitroso reaction product has a characteristic temperature at which it decomposes to regenerate the nitroso compound and diisocyanate or polyisocyanate. Thus, by judicious choice of the post-processing temperature, further crosslinking can be induced in the originally thermoplastic composition to provide thermoset-like properties.

Any isocyanate available to one of ordinary skill in the art is suitable for use according to the invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: $O=C=N-R-N=C=O$, where R preferably is a cyclic, aromatic, or linear or branched hydrocarbon moiety containing from about 1 to about 50 carbon atoms. The isocyanate also may contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4''-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

In view of the advantages of injection molding versus the more complex casting process, under some circumstances it is advantageous to have formulations capable of curing as a thermoset but only within a specified temperature range above that of the typical injection molding process. This allows parts, such as golf ball cover layers, to be initially injection molded, followed by subsequent processing at higher temperatures and pressures to induce further crosslinking and curing, resulting in thermoset properties in the final part. Such an initially injection moldable composition is thus called a post curable urethane or urea composition.

If a post curable urethane composition is required, a modified or blocked diisocyanate which subsequently unblocks and induces further cross linking post extrusion may be included in the diisocyanate starting material. Modified isocyanates used for making the polyurethanes of the present invention generally are defined as chemical compounds containing isocyanate groups that are not reactive at room temperature, but that become reactive once they reach a characteristic temperature. The resulting isocyanates can act as crosslinking agents or chain extenders to form crosslinked polyurethanes. The degree of crosslinking is governed by type and concentration of modified isocyanate presented in the composition. The modified isocyanate used in the composition preferably is selected, in part, to have a characteristic temperature sufficiently high such that the urethane in the composition will retain its thermoplastic behavior during initial processing (such as injection molding). If a characteristic temperature is too low, the composition crosslinks before processing is completed, leading to process difficulties. The modified isocyanate preferably is selected from isophorone diisocyanate (IPDI)-based uretdione-type crosslinker; a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethylpyrazole modified isocyanate; or mixtures of these. Particular preferred examples of modified isocyanates include those marketed under the trade name CRELAN by Bayer Corporation. Examples of these include: CRELAN TP LS 2147; CRELAN NI 2; isophorone diisocyanate (IPDI)-based uretdione-type crosslinker, such as CRELAN VP LS 2347; a combination of a uretdione adduct of IPDI and a partially e-caprolactam-modified IPDI, such as CRELAN VP LS 2386; a combination of isocyanate adducts modified by e-caprolactam and a carboxylic acid functional group, such as CRELAN VP LS 2181/1; a caprolactam-modified Desmodur diisocyanate, such as CRELAN NW5; and a Desmodur diisocyanate having a 3,5-dimethylpyrazole modified isocyanate, such as CRELAN XP 7180. These modified isocyanates may be used either alone or in combination. Such modified diisocyanates are described in more detail in U.S. Pat. No. 6,939,924, the entire contents of which are hereby incorporated by reference.

As an alternative if a post curable polyurethane or polyurea composition is required, the diisocyanate may further comprise reaction product of a nitroso compound and a diisocyanate or a polyisocyanate. The reaction product has a characteristic temperature at which it decomposes regenerating the nitroso compound and diisocyanate or polyisocyanate, which can, by judicious choice of the post processing temperature, in turn induce further crosslinking in the originally thermoplastic composition resulting in thermoset-like properties. Such nitroso compounds are described in more detail in U.S. Pat. No. 7,037,985 B2, the entire contents of which are hereby incorporated by reference.

Any polyol now known or hereafter developed is suitable for use according to the invention. Polyols suitable for use in the present invention include, but are not limited to, polyester polyols, polyether polyols, polycarbonate polyols and polydiene polyols such as polybutadiene polyols.

Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, masonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. The polyether polyol may be used either alone or in a combination.

Polycarbonate polyol is obtained by the condensation of a known polyol (polyhydric alcohol) with phosgene, chloroformic acid ester, dialkyl carbonate or diallyl carbonate. Particularly preferred polycarbonate polyols contain a polyol component using 1,6-hexanediol, 1,4-butanediol, 1,3-butanediol, neopentylglycol or 1,5-pentanediol. Polycarbonate polyols can be used either alone or in a combination with other polyols.

Polydiene polyols include liquid diene polymer containing hydroxyl groups having an average of at least 1.7 functional groups, and may comprise diene polymers or diene copolymers having from about 4 to about 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Polybutadiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant Any polyamine available to one of ordinary skill in the polyurethane art is suitable for use according to the disclosure herein. Polyamines suitable for use include, but are not limited to, amine-terminated compounds typically are selected from amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly(ethylene oxide capped oxypropylene)ether diamines, triethyleneglycoldiamines, propylene oxide-based triamines, trimethylolpropane-based triamines, glycerin-based triamines, and mixtures thereof.

Diisocyanate and polyol or polyamine components may be combined to form a prepolymer prior to reaction with a chain extender or curing agent. Any such prepolymer combination is suitable for use in the present invention. Commercially available prepolymers include LFH580, LFH120, LFH710, LFH1570, LF930A, LF950A, LF601D, LF751D, LFG963A, LFG640D.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent, and even more preferably from about 3 percent to about 9 percent, free NCO on an equivalent weight basis.

Polyol chain extenders or curing agents may be primary, secondary, or tertiary polyols. Non-limiting examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Diamines and other suitable polyamines may be added to the compositions to function as chain extenders or curing agents. These include primary, secondary and tertiary amines having two or more amines as functional groups. Exemplary diamines include aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as diethyl-2,4-toluenediamine, 4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, 4,4'-methylene bis-2-chloroaniline, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol.

Further examples include ethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-(bis-propylamine); monoethanolamine, diethanolamine; triethanolamine; monoisopropanolamine, diisopropanolamine; isophoronediamine; and mixtures thereof.

Aromatic diamines have a tendency to provide a stiffer (i.e., having a higher Mooney viscosity) product than aliphatic or cycloaliphatic diamines.

Depending on their chemical structure, curing agents may be slow- or fast-reacting polyamines or polyols. As described in U.S. Pat. Nos. 6,793,864, 6,719,646 and copending U.S. Patent Publication No. 2004/0201133 A1, (the contents of all of which are hereby incorporated herein by reference), slow-reacting polyamines are diamines having amine groups that are sterically and/or electronically hindered by electron withdrawing groups or bulky groups situated proximate to the amine reaction sites. The spacing of the amine reaction sites will also affect the reactivity speed of the polyamines.

Suitable curatives for use in the present invention are selected from the slow-reacting polyamine group include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

When slow-reacting polyamines are used as the curing agent to produce urethane elastomers, a catalyst is typically needed to promote the reaction between the urethane prepolymer and the curing agent. Specific suitable catalysts include TEDA (1) dissolved in di-propylene glycol (such as TEDA L33 available from Witco Corp. Greenwich, Conn., and DABCO 33 LV available from Air Products and Chemicals Inc.). Catalysts are added at suitable effective amounts, such as from about 2% to about 5%, and (2) more preferably TEDA dissolved in 1,4-butane diol from about 2% to about 5%. Another suitable catalyst includes a blend of 0.5% 33LV or TEDA L33 (above) with 0.1% dibutyl tin dilaurate (available from Witco Corp. or Air Products and Chemicals, Inc.) which is added to a curative such as VIBRACURE® A250. Unfortunately, as is well known in the art, the use of a catalyst can have a significant effect on the ability to control the reaction and thus, on the overall processability.

To eliminate the need for a catalyst, a fast-reacting curing agent, or agents, can be used that does not have electron withdrawing groups or bulky groups that interfere with the reaction groups. However, the problem with lack of control associated with the use of catalysts is not completely eliminated since fast-reacting curing agents also are relatively difficult to control.

Preferred curing agent blends include using dicyandiamide in combination with fast curing agents such as diethyl-2,4-toluenediamine, 4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine and Curalon L, a trade name for a mixture of aromatic diamines sold by Uniroyal, Inc. or any and all combinations thereof. A preferred fast-reacting curing agent is diethyl-2,4-toluene diamine, which has two commercial grades names, Ethacure® 100 and Ethacure® 100LC commercial grade has lower color and less by-product. In other words, it is considered a cleaner product to those skilled in the art.

Advantageously, the use of the Ethacure® 100LC commercial grade results in a golf ball that is less susceptible to yellowing when exposed to UV light conditions. A player appreciates this desirable aesthetic effect although it should be noted that the instant invention may use either of these two commercial grades for the curing agent diethyl-2,4-toluenediamine.

If a reduced-yellowing post curable composition is required the chain extender or curing agent can further comprise a peroxide or peroxide mixture. Before the composition is exposed to sufficient thermal energy to reach the activation temperature of the peroxide, the composition of (a) and (b) behaves as a thermoplastic material. Therefore, it can readily be formed into golf ball layers using injection molding. However, when sufficient thermal energy is applied to bring the composition above the peroxide activation temperature, crosslinking occurs, and the thermoplastic polyurethane is converted into crosslinked polyurethane.

Examples of suitable peroxides for use in compositions within the scope of the present invention include aliphatic peroxides, aromatic peroxides, cyclic peroxides, or mixtures of these. Primary, secondary, or tertiary peroxides can be used, with tertiary peroxides most preferred. Also, peroxides containing more than one peroxy group can be used, such as 2,5-bis-(tert-butylperoxy)-2,5-dimethyl hexane and 1,4-bis-(tert-butylperoxy-isopropyl)-benzene. Also, peroxides that are either symmetrical or asymmetric can be used, such as tert-butylperbenzoate and tert-butylcumylperoxide. Additionally, peroxides having carboxy groups also can be used. Decomposition of peroxides used in compositions within the scope of the present invention can be brought about by applying thermal energy, shear, reactions with other chemical ingredients, or a combination of these. Homolytically decomposed peroxide, heterolytically decomposed peroxide, or a mixture of those can be used to promote crosslinking reactions in compositions within the scope of this invention. Examples of suitable aliphatic peroxides and aromatic peroxides include diacetylperoxide, di-tert-butylperoxide, dibenzoylperoxide, dicumylperoxide, 2,5-bis-(t-butylperoxy)-2,5-dimethyl hexane, 2,5-dimethyl-2,5-di(benzoylperoxy)hexane, 2,5-dimethyl-2,5-di(butylperoxy)-3-hexyne, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl). Peroxides for use within the scope of this invention may be acquired from Akzo Nobel Polymer Chemicals of Chicago, Ill., Atofina of Philadelphia, Pa. and Akrochem of Akron, Ohio. Further details of this post curable system are disclosed in U.S. Pat. No. 6,924,337, the entire contents of which are hereby incorporated by reference.

The core, cover layer and, optionally, one or more inner cover layers of the golf ball may further comprise one or more ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers can be ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, all of which can be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ α,β ethylenically unsaturated carboxylic acid, such as acrylic or methacrylic acid, and is present in an amount from about 0 wt. % to about 50 wt. %, particularly about 2 to about 30 weight %, of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight %, particularly about 5 wt. % to about 35 wt. %, of the E/X/Y copolymer, and wherein the acid groups present in said ionomeric polymer are partially (e.g., about 1% to about 90%) neutralized with a metal selected from the group consisting of lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a) a high molecular weight component having a weight average molecular weight (Mw) of from about 80,000 to about 500,000 and comprising one or more ethylene/α, β-ethylenically unsaturated $C_{3-8}$ carboxylic acid copolymers and/or one or more ethylene, alkyl(meth) acrylate, (meth)acrylic acid terpolymers; said high molecular weight component being partially neutralized with metal ions selected from the group consisting of lithium, sodium, zinc, calcium, magnesium, and a mixture of any these; and b) a low molecular weight component having a weight average molecular weight (Mw) of from about 2,000 to about 30,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; said low molecular weight component being partially neutralized with metal ions selected from the group consisting of lithium, sodium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication No. US 2003/0158312 A1, the entire contents of all of which are herein incorporated by reference.

The modified unimodal ionomers may be prepared by mixing:

a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, zinc, calcium, magnesium, and a mixture of any of these; and b) from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;

a) a high molecular weight component having a weight average molecular weight ($M_w$) of from about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; said high molecular weight component being partially neutralized with metal ions selected from the group consisting of lithium, sodium, zinc, calcium, potassium, magnesium, and a mixture of any of these; and b) a low molecular weight component having a weight average molecular weight ($M_w$) of from about 2,000 to about 30,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; said low molecular weight component being partially neutralized with metal ions selected from the group consisting of lithium, sodium, zinc, calcium, potassium, magnesium, and a mixture of any of these; and c) from about 5 to about 40 weight percent (based on the total weight of said modified ionomeric polymer) of one or more fatty acids or metal salts of said fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_xCOOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$) and lauric acid ($C_{12}$, i.e., $CH_3(CH_2)_{10}OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3(CH_2)_7CH:CH(CH_2)_7COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I. DuPont de Nemours and Co. Inc.

A preferred ionomer composition may be prepared by blending one or more of the unimodal ionomers, bimodal ionomers, or modified unimodal or bimodal ionomeric polymers as described herein, and further blended with a zinc neutralized ionomer of a polymer of general formula E/X/Y where E is ethylene, X is a softening comonomer such as acrylate or methacrylate and is present in an amount of from 0 to about 50, preferably 0 to about 25, most preferably 0, and Y is acrylic or methacrylic acid and is present in an amount from about 5 wt. % to about 25, preferably from about 10 to about 25, and most preferably about 10 to about 20 wt. % of the total composition.

In particular embodiment, blends used to make the core, intermediate and/or cover layers may include about 5 to about 95 wt. %, particularly about 5 to about 75 wt. %, preferably about 5 to about 55 wt. %, of a specialty propylene elastomer(s) and about 95 to about 5 wt. %, particularly about 95 to about 25 wt. %, preferably about 95 to about 45 wt. %, of at least one ionomer, especially a high-acid ionomer.

In yet another embodiment, a blend of an ionomer and a block copolymer can be included in the composition. An example of a block copolymer is a functionalized styrenic block copolymer, the block copolymer incorporating a first polymer block having an aromatic vinyl compound, a second polymer block having a conjugated diene compound, and a hydroxyl group located at a block copolymer, or its hydrogenation product, in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight. A preferred block copolymer is SEPTON HG-252. Such blends are described in more detail in commonly-assigned U.S. Pat. No. 6,861,474 and U.S. Patent Publication No. 2003/0224871 both of which are incorporated herein by reference in their entireties.

In a further embodiment, the core, mantle and/or cover layers (and particularly a mantle layer) can comprise a composition prepared by blending together at least three materials, identified as Components A, B, and C, and melt-processing these components to form in-situ a polymer blend composition incorporating a pseudo-crosslinked polymer network. Such blends are described in more detail in commonly-assigned U.S. Pat. No. 6,930,150, which is incorporated by reference herein in its entirety. Component A is a monomer, oligomer, prepolymer or polymer that incorporates at least five percent by weight of at least one type of an anionic functional group, and more preferably between about 5% and 50% by weight. Component B is a monomer, oligomer, or polymer that incorporates less by weight of anionic functional groups than does Component A, Component B preferably incorporates less than about 25% by weight of anionic functional groups, more preferably less than about 20% by weight, more preferably less than about 10% by weight, and most preferably Component B is free of anionic functional groups. Component C incorporates a metal cation, preferably as a metal salt. The pseudo-crosslinked network structure is formed in-situ, not by covalent bonds, but instead by ionic clustering of the reacted functional groups of Component A. The method can incorporate blending together more than one of any of Components A, B, or C.

The polymer blend can include either Component A or B dispersed in a phase of the other. Preferably, blend compositions comprises between about 1% and about 99% by weight of Component A based on the combined weight of Components A and B, more preferably between about 10% and about 90%, more preferably between about 20% and about 80%, and most preferably, between about 30% and about 70%. Component C is present in a quantity sufficient to produce the preferred amount of reaction of the anionic functional groups of Component A after sufficient melt-processing. Preferably, after melt-processing at least about 5% of the anionic functional groups in the chemical structure of Component A have been consumed, more preferably between about 10% and about 90%, more preferably between about 10% and about 80%, and most preferably between about 10% and about 70%.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Next, reaction is made to take place in-situ at the site of the anionic functional groups of Component A with Component C in the presence of Component B. This reaction is prompted by addition of heat to the mixture. The reaction results in the formation of ionic clusters in Component A and formation of a pseudo-crosslinked structure of Component A in the presence of Component B. Depending upon the structure of Component B, this pseudo-crosslinked Component A can combine with Component B to form a variety of interpenetrating network structures. For example, the materials can form a pseudo-crosslinked network of Component A dispersed in the phase of Component B, or Component B can be dispersed in the phase of the pseudo-crosslinked network of Component A. Component B may or may not also form a network, depending upon its structure, resulting in either: a fully-interpenetrating network, i.e., two independent networks of Components A and B penetrating each other, but not covalently bonded to each other; or, a semi-interpenetrating network of Components A and B, in which Component B forms a linear, grafted, or branched polymer interspersed in the network of Component A. For example, a reactive functional group or an unsaturation in Component B can be reacted to form a crosslinked structure in the presence of the in-situ-formed, pseudo-crosslinked structure of Component A, leading to formation of a fully-interpenetrating network. Any anionic functional groups in Component B also can be reacted with the metal cation of Component C, resulting in pseudo-crosslinking via ionic cluster attraction of Component A to Component B.

The level of in-situ-formed pseudo-crosslinking in the compositions formed by the present methods can be controlled as desired by selection and ratio of Components A and B, amount and type of anionic functional group, amount and type of metal cation in Component C, type and degree of chemical reaction in Component B, and degree of pseudo-crosslinking produced of Components A and B.

As discussed above, the mechanical and thermal properties of the polymer blend for the inner mantle layer and/or the outer mantle layer can be controlled as required by a modifying any of a number of factors, including: chemical structure of Components A and B, particularly the amount and type of anionic functional groups; mean molecular weight and molecular weight distribution of Components A and B; linearity and crystallinity of Components A and B; type of metal cation in Component C; degree of reaction achieved between the anionic functional groups and the metal cation; mix ratio of Component A to Component B; type and degree of chemical reaction in Component B; presence of chemical reaction, such as a crosslinking reaction, between Components A and B; and the particular mixing methods and conditions used.

As discussed above, Component A can be any monomer, oligomer, prepolymer, or polymer incorporating at least 5% by weight of anionic functional groups. Those anionic functional groups can be incorporated into monomeric, oligomeric, prepolymeric, or polymeric structures during the synthesis of Component A, or they can be incorporated into a pre-existing monomer, oligomer, prepolymer, or polymer through sulfonation, phosphonation, or carboxylation to produce Component A.

Preferred, but non-limiting, examples of suitable copolymers and terpolymers include copolymers or terpolymers of: ethylene/acrylic acid, ethylene/methacrylic acid, ethylene/itaconic acid, ethylene/methyl hydrogen maleate, ethylene/maleic acid, ethylene/methacrylic acid/ethylacrylate, ethylene/itaconic acid/methyl methacrylate, ethylene/methyl hydrogen maleate/ethyl acrylate, ethylene/methacrylic acid/vinyl acetate, ethylene/acrylic acid/vinyl alcohol, ethylene/propylene/acrylic acid, ethylene/styrene/acrylic acid, ethylene/methacrylic acid/acrylonitrile, ethylene/fumaric acid/vinyl methyl ether, ethylene/vinyl chloride/acrylic acid, ethylene/vinyldiene chloride/acrylic acid, ethylene/vinyl fluoride/methacrylic acid, and ethylene/chlorotrifluoroethylene/methacrylic acid, or any metallocene-catalyzed polymers of the above-listed species.

Another family of thermoplastic elastomers for use in the golf balls are polymers of i) ethylene and/or an alpha olefin; and ii) an $\alpha,\beta$-ethylenically unsaturated $C_3$-$C_{20}$ carboxylic acid or anhydride, or an $\alpha,\beta$-ethylenically unsaturated $C_3$-$C_{20}$ sulfonic acid or anhydride or an $\alpha,\beta$-ethylenically unsaturated $C_3$-$C_{20}$ phosphoric acid or anhydride and, optionally iii) a $C_1$-$C_{10}$ ester of an $\alpha,\beta$-ethylenically unsaturated $C_3$-$C_{20}$ carboxylic acid or a $C_1$-$C_{10}$ ester of an $\alpha,\beta$-ethylenically unsaturated $C_3$-$C_{20}$ sulfonic acid or a $C_1$-$C_{10}$ ester of an $\alpha,\beta$-ethylenically unsaturated $C_3$-$C_{20}$ phosphoric acid.

Preferably, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred. Preferably, the carboxylic acid ester if present may be selected from the group consisting of vinyl esters of aliphatic carboxylic acids wherein the acids have 2 to 10 carbon atoms and vinyl ethers wherein the alkyl groups contain 1 to 10 carbon atoms.

Examples of such polymers suitable for use include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

Most preferred are ethylene/(meth)acrylic acid copolymers and ethylene/(meth)acrylic acid/alkyl(meth)acrylate terpolymers, or ethylene and/or propylene maleic anhydride copolymers and terpolymers.

The acid content of the polymer may contain anywhere from 1 to 30 percent by weight acid. In some instances, it is preferable to utilize a high acid copolymer (i.e., a copolymer containing greater than 16% by weight acid, preferably from about 17 to about 25 weight percent acid, and more preferably about 20 weight percent acid).

Examples of such polymers which are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich.

Also included are the bimodal ethylene/carboxylic acid polymers as described in U.S. Pat. No. 6,562,906. These polymers comprise ethylene/$\alpha,\beta$-ethylenically unsaturated $C_{3-8}$ carboxylic acid high copolymers, particularly ethylene (meth)acrylic acid copolymers and ethylene, alkyl(meth)acrylate, (meth)acrylic acid terpolymers, having molecular weights of about 80,000 to about 500,000 which are melt blended with ethylene/$\alpha,\beta$-ethylenically unsaturated $C_{3-8}$ carboxylic acid copolymers, particularly ethylene/(meth)acrylic acid copolymers having molecular weights of about 2,000 to about 30,000.

As discussed above, Component B can be any monomer, oligomer, or polymer, preferably having a lower weight percentage of anionic functional groups than that present in Component A in the weight ranges discussed above, and most preferably free of such functional groups. Examples of suitable materials for Component B include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrylonitrile styrene acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-propylene copolymer, ethylene vinyl acetate, polyurea, and polysiloxane or any metallocene-catalyzed polymers of these species. Particularly suitable polymers for use as Component B include polyethylene-terephthalate, polybutyleneterephthalate, polytrimethylene-terephthalate, ethylene-carbon monoxide copolymer, polyvinyl-diene fluorides, polyphenylene-sulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with functional group, polymers based on ethylene-propylene-(diene), polymers based on functionalized ethylene-propylene-diene), dynamically vulcanized polypropylene/ethylene-propylene-diene-copolymer, thermoplastic vulcanizates based on ethylene-propylene-(diene), thermoplastic polyetherurethane, thermoplastic polyesterurethane, compositions for making thermoset polyurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorohydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Preferred materials for use as Component B include polyester elastomers marketed under the name PEBAX and LOTADER marketed by ATOFINA Chemicals of Philadelphia, Pa.; HYTREL, FUSABOND, and NUCREL marketed by E.I. DuPont de Nemours & Co. of Wilmington, Del.; SKYPEL and SKYTHANE by S.K. Chemicals of Seoul, South Korea; SEPTON and HYBRAR marketed by Kuraray Company of Kurashiki, Japan; ESTHANE by Noveon; and KRATON marketed by Kraton Polymers. A most preferred material for use as Component B is SEPTON HG-252

As stated above, Component C is a metal cation. These metals are from groups IA, IB, IIA, IIB, IIIA, IIIB, IVA, IVB, VA, VB, VIIA, VIIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal carbonates, or metal acetates. In addition to Components A, B, and C, other materials commonly used in polymer blend compositions, can be incorporated into compositions prepared using these methods, including: crosslinking agents, co-crosslinking agents, accelerators, activators, UV-active chemicals such as UV initiators, EB-active chemicals, colorants, UV stabilizers, optical brighteners, antioxidants, processing aids, mold release agents, foaming agents, and organic, inorganic or metallic fillers or fibers, including fillers to adjust specific gravity.

Various known methods are suitable for preparation of polymer blends. For example, the three components can be premixed together in any type of suitable mixer, such as a V-blender, tumbler mixer, or blade mixer. This premix then can be melt-processed using an internal mixer, such as Banbury mixer, roll-mill or combination of these, to produce a reaction product of the anionic functional groups of Component A by Component C in the presence of Component B. Alternatively, the premix can be melt-processed using an extruder, such as single screw, co-rotating twin screw, or counter-rotating twin screw extruder, to produce the reaction product. The mixing methods discussed above can be used together to melt-mix the three components to prepare the compositions of the present invention. Also, the components can be fed into an extruder simultaneously or sequentially.

Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system. In this case, Components A and B can be fed into the extruder through a main hopper to be melted and well-mixed while flowing downstream through the extruder. Then Component C can be fed into the extruder to react with the mixture of Components A and B between the feeding port for Component C and the die head of the extruder. The final polymer composition then exits from the die. If desired, any extra steps of melt-mixing can be added to either approach of the method of the present invention to provide for improved mixing or completion of the reaction between Components A and C. Also, additional components discussed above can be incorporated either into a premix, or at any of the melt-mixing stages. Alternatively, Components A, B, and C can be melt-mixed simultaneously to form in-situ a pseudo-crosslinked structure of Component A in the presence of Component B, either as a fully or semi-interpenetrating network.

Illustrative polyamides for use in the compositions/golf balls disclosed include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

The polyamide may be any homopolyamide or copolyamide. One example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 11, Nylon 12 and the like) as a hard segment and a polyether or polyester as a soft segment. In one specific example, the thermoplastic polyamides are amorphous copolyamides based on polyamide (PA 12).

One class of copolyamide elastomers are polyether amide elastomers. Illustrative examples of polyether amide elastomers are those that result from the copolycondensation of polyamide blocks having reactive chain ends with polyether blocks having reactive chain ends, including:

(1) polyamide blocks of diamine chain ends with polyoxyalkylene sequences of dicarboxylic chains;

(2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and (3) polyamide blocks of dicarboxylic chain ends with polyether diols, the products obtained, in this particular case, being polyetheresteramides.

More specifically, the polyamide elastomer can be prepared by polycondensation of the components (i) a diamine and a dicarboxylate, lactames or an amino dicarboxylic acid (PA component), (ii) a polyoxyalkylene glycol such as polyoxyethylene glycol, polyoxy propylene glycol (PG component) and (iii) a dicarboxylic acid.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences is preferably between about 300 and 15,000, and more preferably between about 600 and 5,000. The molecular weight of the polyether sequences is preferably between about 100 and 6,000, and more preferably between about 200 and 3,000.

The amide block polyethers may also comprise randomly distributed units. These polymers may be prepared by the simultaneous reaction of polyether and precursor of polyamide blocks. For example, the polyether diol may react with a lactam (or alpha-omega amino acid) and a diacid which limits the chain in the presence of water. A polymer is obtained that has primarily polyether blocks and/or polyamide blocks of very variable length, but also the various reactive groups that have reacted in a random manner and which are distributed statistically along the polymer chain.

Suitable amide block polyethers include those as disclosed in U.S. Pat. Nos. 4,331,786; 4,115,475; 4,195,015; 4,839,441; 4,864,014; 4,230,848 and 4,332,920.

The polyether may be, for example, a polyethylene glycol (PEG), a polypropylene glycol (PPG), or a polytetramethylene glycol (PTMG), also designated as polytetrahydrofurane (PTHF). The polyether blocks may be along the polymer chain in the form of diols or diamines. However, for reasons of simplification, they are designated PEG blocks, or PPG blocks, or also PTMG blocks.

The polyether block comprises different units such as units which derive from ethylene glycol, propylene glycol, or tetramethylene glycol.

The amide block polyether comprises at least one type of polyamide block and one type of polyether block. Mixing of two or more polymers with polyamide blocks and polyether blocks may also be used. The amide block polyether also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of 1/1 to 3/1.

One type of polyetherester elastomer is the family of Pebax, which are available from Elf-Atochem Company. Preferably, the choice can be made from among Pebax 2533, 3533, 4033, 1205, 7033 and 7233. Blends or combinations of Pebax 2533, 3533, 4033, 1205, 7033 and 7233 can also be prepared, as well. Pebax 2533 has a hardness of about 25 shore D (according to ASTM D-2240), a Flexural Modulus of 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of 67 kpsi (according to ASTM D-790). Pebax 7333 has a hardness of about 72 shore D (according to ASTM D-2240) and a Flexural Modulus of 107 kpsi (according to ASTM D-790).

Some examples of suitable polyamides for use include those commercially available under the tradenames PEBAX, CRISTAMID and RILSAN marketed by Atofina Chemicals of Philadelphia, Pa., GRIVORY and GRILAMID marketed by EMS Chemie of Sumter, S.C., TROGAMID and VESTAMID available from Degussa, and ZYTEL marketed by E.I. DuPont de Nemours & Co., of Wilmington, Del.

The layer or core compositions can also incorporate one or more fillers. Such fillers are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler comprises a continuous or non-continuous fiber. In another preferred embodiment the filler comprises one or more so called nanofillers, as described in U.S. Pat. No. 6,794,447 and U.S. Patent Publication No. 2004-0092336A1 published May 13, 2004 and U.S. Patent Publication No. 2005-0059756A1 published Mar. 17, 2005, the entire contents of each of which are herein incorporated by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

As mentioned above, the nanofiller particles have an aggregate structure with the aggregates particle sizes in the micron range and above. However, these aggregates have a stacked plate structure with the individual platelets being roughly 1 nanometer (nm) thick and 100 to 1000 nm across. As a result, nanofillers have extremely high surface area, resulting in high reinforcement efficiency to the material at low loading levels of the particles. The sub-micron-sized particles enhance the stiffness of the material, without increasing its weight or opacity and without reducing the material's low-temperature toughness.

Nanofillers when added into a matrix polymer, can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some cases, further penetration of the matrix polymer chains into the aggregate structure separates the platelets, and leads to a complete breaking up of the platelet's stacked structure in the aggregate and thus when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

As used herein, a "nanocomposite" is defined as a polymer matrix having nanofiller intercalated or exfoliated within the matrix. Physical properties of the polymer will change with the addition of nanofiller and the physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans. uses a 3% to 5% clay loading and has a tensile strength of 11,800 psi and a specific gravity of 1.14, while a conventional 30% mineral-filled material has a tensile strength of 8,000 psi and a specific gravity of 1.36.

Because use of nanocomposite materials with lower loadings of inorganic materials than conventional fillers provides the same properties, this use allows products to be lighter than those with conventional fillers, while maintaining those same properties.

Nanocomposite materials are materials incorporating from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and U.S. Pat. No. 4,894,411 to Okada et al, Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

Preferably the nanofiller material is added to the polymeric composition in an amount of from about 0.1% to about 20%, preferably from about 0.1% to about 15%, and most preferably from about 0.1% to about 10% by weight of nanofiller reacted into and substantially dispersed through intercalation or exfoliation into the structure of the polymeric composition.

If desired, the various polymer compositions used to prepare the golf balls can additionally contain other additives such as plasticizers, pigments, antioxidants, U.V. absorbers, optical brighteners, or any other additives generally employed in plastics formulation or the preparation of golf balls.

Another particularly well-suited additive for use in the presently disclosed compositions includes compounds having the general formula:

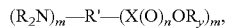

where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. Provisional Patent Application No. 60/588, 603, filed on Jul. 16, 2004, the entire contents of which are herein incorporated by reference. These materials include caprolactam, oenantholactam, decanolactam, undecanolactam, dodecanolactam, caproic 6-amino acid, 11-aminoundecanoic acid, 12-aminododecanoic acid, diamine hexamethylene salts of adipic acid, azeleic acid, sebacic acid and 1,12-dodecanoic acid and the diamine nonamethylene salt of adipic acid, 2-aminocinnamic acid, L-aspartic acid, 5-aminosalicylic acid, aminobutyric acid; aminocaproic acid; aminocapyryic acid; 1-(aminocarbonyl)-1-cyclopropanecarboxylic acid; aminocephalosporanic acid; aminobenzoic acid; aminochlorobenzoic acid; 2-(3-amino-4-chlorobenzoyl)benzoic acid; aminonaphtoic acid; aminonicotinic acid; aminonorbornanecarboxylic acid; aminoorotic acid; aminopenicillanic acid; aminopentenoic acid; (aminophenyl)butyric acid; aminophenyl propionic acid; aminophthalic acid; aminofolic acid; aminopyrazine carboxylic acid; aminopyrazole carboxylic acid; aminosalicylic acid; aminoterephthalic acid; aminovaleric acid; ammonium hydrogencitrate; anthranillic acid; aminobenzophenone carboxylic acid; aminosuccinamic acid, epsilon-caprolactam; omega-caprolactam, (carbamoylphenoxy)acetic acid, sodium salt; carbobenzyloxy aspartic acid; carbobenzyl glutamine; carbobenzyloxyglycine; 2-aminoethyl hydrogensulfate; aminonaphthalenesulfonic acid; aminotoluene sulfonic acid; 4,4'-methylene-bis-(cyclohexylamine)carbamate and ammonium carbamate.

Most preferably the material is selected from the group consisting of 4,4'-methylene-bis-(cyclohexylamine)carbamate (commercially available from R.T. Vanderbilt Co., Norwalk, Conn. under the tradename Diak® 4), 11-aminoundecanoicacid, 12-aminododecanoic acid, epsilon-caprolactam; omega-caprolactam, and any and all combinations thereof.

In an especially preferred embodiment a nanofiller additive component in the golf ball is surface modified with a compatibilizing agent comprising the earlier described compounds having the general formula:

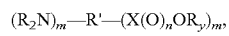

A most preferred embodiment would be a filler comprising a nanofiller clay material surface modified with an amino acid including 12-aminododecanoic acid. Such fillers are available from Nanonocor Co. under the tradename Nanomer 1.24TL.

Disclosed compositions have sufficient shear-cut resistance and excellent mechanical properties that make them suitable for making sports equipment, such as a recreation ball, a golf club or component thereof, such as a grip, shoes, glove, helmet, protective gears, bicycle, football, soccer, basketball, baseball, volley ball, hockey, ski, skate and the like.

Golf Ball Composition and Construction

Disclosed golf balls comprise a core and at least one additional layer made from disclosed resin compositions comprising the polyalkenamer and functionalized organic modifier.

The golf balls having at least one layer made from the presently disclosed resin compositions can dampen the acoustic output of the golf ball when it is struck. In addition, the resin composition allows for altering the sound of the golf ball by selectively positioning the layer and the different hardness made of the resin composition.

Since the material hardness is related to the crosslink density in the system, varying the composition allows for adjusting the material hardness. The material hardness affects ball performance such as driver, iron and wedge spin rates. In general, a low hardness material on the ball provides high spin and soft feel and the high hardness material on the ball generates low spin and hard feel. Disclosed golf balls comprise a core and at least one additional layer made from disclosed resin compositions can adjust the ball performance by varying the composition.

1. Core

Referring to the drawing in FIG. 1, there is illustrated a golf ball 1, which comprises a solid center or core 2, which may be formed as a solid body of the herein described composition and in the shape of the sphere.

Ball cores of the present invention have a diameter of from about 0.1 to about 1.65 inches, preferably from about 0.3 to about 1.64 inches, more preferably from about 0.4 to about 1.62 inches, most preferably from about 0.5 to about 1.60 inches.

In another preferred embodiment, the golf ball core has at least one core layer on the center core, the layer having a thickness of from about 0.01 inch to about 1.14 inches, preferably from about 0.02 inch to about 1.12 inches, more preferably from about 0.025 inch to about 1.00 inches and most preferably from about 0.03 inch to about 0.08 inch. The core of the balls also may have a PGA compression of below 120, preferably below 100, more preferably below 90, and most preferably below 80. In another embodiment, the core of the balls may have a PGA compression of from about 10 to about 100, preferably from about 20 to about 90, more preferably from about 30 to about 80.

In one embodiment the core may comprise the polyalkenamer/functionalized organic modifier composition in the center and optionally, one or more core layers disposed around the center. These core layers may be made from the same polyalkenamer/functionalized organic modifier composition as used in the center portion, or may be a different thermoplastic elastomer. In certain embodiments, the polyalkenamer/functionalized organic modifier composition is the majority ingredient in the core, and may, for instance, constitute at least 90, more particularly 95, wt % of the core.

The various core layers (including the center) may each exhibit a different hardness. The difference between the center hardness and that of the next adjacent layer, as well as the difference in hardness between the various core layers may be greater than 2, preferably greater than 5, most preferably greater than 10 units of Shore D.

In one preferred embodiment, the hardness of the center and each sequential layer increases progressively outwards from the center to outer core layer.

In another preferred embodiment, the hardness of the center and each sequential layer decreases progressively inwards from the outer core layer to the center.

2. Intermediate Layer(s)

Again referring to the drawing in FIG. 1, there is illustrated a golf ball 1, which comprises a solid center or core 2, which may be formed as a solid body of the herein described composition and in the shape of the sphere, an intermediate layer 3, disposed on the spherical core and an outer cover layer 4.

The golf ball may comprise from 0 to 5, preferably from 0 to 3, more preferably from 1 to 3, most preferably 1 to 2 intermediate layer(s).

The one or more intermediate layers of the golf balls also has a Shore D hardness greater than about 20, preferably greater than about 30, and typically greater than about 40.

The one or more intermediate layers of the golf balls has a flexural modulus from about 1 to about 500 kpsi, preferably from about 5 to about 300 kpsi, more preferably from about 10 to about 200 kpsi, and most preferably from about 15 to about 150 kpsi.

One example of a ball construction, referred to as ball construction I, preferably has the following characteristics:
Flexural modulus of Core material (F1)<30 kpsi;
Flexural modulus of Outer Core or Inner Mantle material (F2) in the range of 15-60 kpsi;
Flexural modulus of Outer Mantle material (F3) in the range of 30-120 kpsi
These moduli satisfy the following:
F1<F2<F3;
F1<F2 at least by 3, preferably by 5, more preferably by 10 kpsi; and
F2<F3 at least by 3, preferably by 5, more preferably by 10 kpsi.

In more detailed features:
Compression of Core (C1) typically is in the range of 10-100;
Compression of Core and Outer Core (C2) is in the range of 40-90;
Compression of Core, Outer core or Inner Mantle, and Outer Mantle (C3) is in the range of 60-120; and
Compression of Ball (C4) is in the range of 70-130.
These compression values satisfy the following inequalities:
C1<C2<C3;
C1<C2 at least by 5, more preferably by 10, and most preferably by 15 compression units;
C2<C3 at least by 5, more preferably by 10, and most preferably by 15 compression units; and
C3−C4<10 compression units.

The inner mantle layer has a thickness of less than 0.15 inches and a Shore D hardness in the range of from about 20 to about 70, and the outer mantle layer has a thickness in the range of from about 0.010 to about 0.15 inches and a Shore D hardness in the range of from about 30 to about 90. In addition, the Shore D hardness value of the outer mantle layer exceeds that of the inner mantle layer by at least 3.

In more detailed features, the thickness of the inner mantle layer more preferably is less than 0.10 inches, more preferably still is less than 0.08 inches, and most preferably is less than 0.07 inches. In addition, the Shore D hardness of the inner mantle layer more preferably is in the range of from about 25 to about 65, more preferably still is in the range of from about 30 to about 65, and most preferably is from about 35 to about 60. Further, the thickness of the outer mantle layer more preferably is in the range of from about 0.015 to about 0.10 inches, more preferably still is in the range of from about 0.02 to about 0.08 inches, and most preferably is in the range of from about 0.025 to about 0.075 inches. In addition, the Shore D hardness value of the outer mantle layer more preferably is in the range of from about 35 to about 85, more preferably still is in the range of from about 40 to about 80, and most preferably is from about 45 to 75. Further, the Shore D hardness value of the outer mantle layer more preferably exceeds that of the inner mantle layer by at least 3, and most preferably by at least 5.

A second disclosed ball construction, referred to as ball construction II, preferably has the following characteristics:
Flexural modulus of Core material (F1)<30 kpsi;
Flexural modulus of Outer core or Inner Mantle material (F2) in the range of from about 25 to about 120 kpsi; and
Flexural modulus of Outer Mantle material (F3) in the range of from about 15 to about 60 kpsi.
These moduli satisfy the inequality that F2≥F3.
In more detailed features of the invention:
Compression of Core (C1) is in the range of from about 10 to about 100;
Compression of Core and Inner Mantle (C2) is in the range of from about 60 to about 120;
Compression of Core, Outer core or Inner Mantle, and Outer Mantle (C3) is in the range of from about 60 to about 120; and
Compression of Ball (C4) is in the range of about 70 to about 130.
These compression values satisfy the following inequalities:
C1<C2≥C3−5, preferably C1<C2≥C3−10;
C1<C2 at least by 5, more preferably by 10, and most preferably by 15 compression units; and
C3−C4<5 compression units The inner mantle layer has a thickness of less than 0.1 inches and a Shore D hardness in the range of from about 30 to about 90, and the outer mantle layer has a thickness in the range of from about 0.010 to about 0.10 inch and a Shore D hardness in the range of from about 20 to about 70. In addition, Shore D hardness value of the inner mantle layer exceeds that of the outer mantle layer by at least 3.

In more detailed features, the thickness of the inner mantle layer more preferably is less than 0.10 inches, more preferably still is less than 0.08 inches, and most preferably is less than 0.07 inches. In addition, the Shore D hardness of the inner mantle layer more preferably is in the range of from about 35 to about 85, more preferably still is in the range of from about 40 to about 80, and most preferably is from about 45 to about 75. Further, the thickness of the outer mantle layer preferably is in the range of from about 0.015 to about 0.10 inch, more preferably still is in the range of from about 0.02 to about 0.08 inches, and most preferably is in the range of from about 0.025 to about 0.075 inches. In addition, the Shore D hardness value of the outer mantle layer more preferably is in the range of from about 25 to about 65, more preferably still is in the range of from about 30 to about 65, and most preferably is from about 35 to 60. Further, the Shore D hardness value of the inner mantle layer more preferably exceeds that of the outer mantle layer by at least 3, and most preferably by at least 5.

In one preferred embodiment, at least one of the intermediate layers comprises the polyalkenamer/functionalized organic modifier compositions described herein. In certain embodiments, the polyalkenamer/functionalized organic modifier composition is the majority ingredient in the intermediate layer, and may, for instance, constitute at least 90, more particularly 95, wt % of the mantle layer.

In one preferred embodiment, the golf ball is a three-piece ball with the polyalkenamer/functionalized organic modifier composition used in the intermediate layer. In a more preferred embodiment the three-piece ball has the polyalkenamer/functionalized organic modifier composition used in the intermediate or mantle layer and a cover comprising a thermoplastic elastomer, a thermoplastic or thermoset polyurethane or an ionomer. In another preferred embodiment, the golf ball is a four-piece ball with the polyalkenamer/functionalized organic modifier composition used in one of the two intermediate layers in the golf ball.

The one or more intermediate layers of the golf balls may have a thickness of about 0.01 to about 0.50 or about 0.01 to about 0.20, preferably from about 0.02 to about 0.30 or from about 0.02 to about 0.15, more preferably from about 0.03 to about 0.20 or from about 0.03 to about 0.10, and most preferably from about 0.03 to about 0.10 or about 0.03 to about 0.06 in.

The one or more intermediate layers of the golf balls also may have a hardness greater than about 25, preferably greater than about 30, more preferably greater than about 40, and most preferably greater than about 50, Shore D units.

The one or more intermediate layers of the golf balls may also have a flexural modulus from about 5 to about 500, preferably from about 15 to about 400, more preferably from about 20 to about 300, still more preferably from about 25 to about 200, and most preferably from about 30 to about 100 kpsi.

In yet other more detailed features, at least one an outer core layer or an intermediate layer includes an ionomeric polymer that comprises:
(a) an ionomeric polymer comprising one or more E/X/Y copolymers, wherein E is ethylene, X is a $C_3$ to $C_8$ $\alpha,\beta$ ethylenically unsaturated carboxylic acid, and Y is a softening comonomer selected from alkyl acrylate and alkyl methacrylate, wherein the alkyl groups have from 1 to 8 carbon atoms, or ionomers of such E/X/Y copolymers, wherein X is in the range of from about 5 to about 35 weight % of the E/X/Y copolymer and Y is in the range of from 0 to about 50 weight % of the E/X/Y copolymer, and wherein the acid groups present in said ionomeric polymer are partially neutralized with a metal selected from zinc, sodium, lithium, calcium, magnesium, and combinations thereof; or
(b) a bimodal ionomeric polymer comprising:
(i) a high molecular weight component having a weight average molecular weight, Mw, in the range of from about 80,000 to about 500,000 and comprising one or more ethylene/$\alpha,\beta$-ethylenically unsaturated $C_{3-8}$ carboxylic acid copolymers and/or one or more ethylene, alkyl(meth)acrylate, (meth)acrylic acid terpolymers, wherein said high molecular weight component is partially neutralized with metal ions selected from lithium, sodium, zinc, calcium, magnesium, and combinations thereof, and
(ii) a low molecular weight component having a weight average molecular weight, Mw, in the range of from about 2,000 to about 30,000 and comprising one or more ethylene/$\alpha,\beta$-ethylenically unsaturated $C_{3-8}$ carboxylic acid copolymers and/or one or more ethylene, alkyl(meth)acrylate, (meth)acrylic acid terpolymers, wherein said low molecular weight component is partially neutralized with metal ions selected from lithium, sodium, zinc, calcium, magnesium, and combinations thereof; or
(c) a modified ionomeric polymer comprising:
(i) a blend composition comprising:
ethylene,
from about 5 to about 25 weight percent (meth)acrylic acid (based on the total weight of said modified ionomeric polymer), and
from 0 to about 40 weight percent of a $C_1$ to $C_8$-alkyl acrylate (based on the total weight of said modified ionomeric polymer), and
from about 5 to about 45 weight percent (based on the total weight of said modified ionomeric polymer) of a fatty acid or one or more metal salts of a fatty acid, or
(ii) a bimodal polymer blend composition comprising:
a high molecular weight component having a weight average molecular weight, Mw, in the range of from about 80,000 to about 500,000 and comprising one or more ethylene/$\alpha,\beta$-ethylenically unsaturated $C_{3-8}$ carboxylic acid copolymers and/or one or more ethylene, alkyl(meth)acrylate, (meth) acrylic acid terpolymers, wherein said high molecular weight component is partially neutralized with metal ions selected lithium, sodium, zinc, calcium, magnesium, and combinations thereof,
a low molecular weight component having a weight average molecular weight, Mw, in the range of from about 2,000 to about 30,000 and comprising one or more ethylene/$\alpha$, $\beta$-ethylenically unsaturated $C_{3-8}$ carboxylic acid copolymers and/or one or more ethylene, alkyl(meth)acrylate, (meth)acrylic acid terpolymers, wherein said low molecular weight component is partially neutralized with metal ions selected from lithium, sodium, zinc, calcium, magnesium, and combinations thereof, and from about 5 to about 45 weight percent (based on the total weight of said modified ionomeric polymer) of a fatty acid or one or more metal salts of a fatty acid; or
(d) a blend composition comprising the reaction product of:
(i) one or more ionomers, and
(ii) a compound having a general formula $(R_2N)_m$—$R'$—$(X(O)_nOR_y)_m$, where R is selected from hydrogen, one or more $C_1$-$C_{20}$ aliphatic systems, one or more cycloaliphatic systems, one or more aromatic systems, and combinations thereof, R' is a bridging group comprising one or more unsubstituted $C_1$-$C_{20}$ straight chain or branched aliphatic or alicyclic groups, or one or more substituted straight chain or branched aliphatic or alicyclic groups, or one or more aromatic groups, or one or more oligomers each containing up to 12 repeating units, and wherein when X=C or S or P, m is 1-3, when X=C, n=1 and y=1, when X=S, n=2 and y=1, and when X=P, n=2 and y=2; or
combinations of (a), (b), (c), and (d).

3. Cover Layer

The cover layer of the balls may have a thickness of about 0.01 to about 0.10, preferably from about 0.02 to about 0.08, more preferably from about 0.03 to about 0.06 in.

The cover layer of the balls may have a hardness Shore D from about 40 to about 70, preferably from about 45 to about 70 or about 50 to about 70, more preferably from 47 to about 68 or about 45 to about 70, and most preferably from about 50 to about 65.

The COR of the golf balls may be greater than about 0.760, preferably greater than about 0.780, more preferably greater than 0.790, most preferably greater than 0.795, and especially greater than 0.800 at 125 ft/sec inbound velocity. In another embodiment, the COR of the golf balls may be greater than about 0.760, preferably greater than about 0.780, more preferably greater than 0.790, most preferably greater than 0.795, and especially greater than 0.800 at 143 ft/sec inbound velocity.

The cover layer the balls may have a flexural modulus lower than about 100 kpsi, preferably lower than 80 kpsi, more preferably lower than 70 kpsi, most preferably lower than 60 kpsi, and especially lower than 50 kpsi.

The cover layer (or layers) may comprise ionomeric or non-ionomeric thermoplastic resin, thermoset resin, thermoplastic vulcanizate, blends of those, and the polyalkenamer/ functionalized organic modifier composition Ionomeric polymer and polymer blend suitable for the cover layer comprises one or more E/X/Y copolymers, wherein E is ethylene, X is a $C_3$ to $C_8$ α,β ethylenically unsaturated carboxylic acid, and Y is a softening comonomer selected from the group consisting of alkyl acrylate and alkyl methacrylate, wherein the alkyl groups have from 1 to 8 carbon atoms, or ionomers of such E/X/Y copolymers, wherein X is in the range of about 5 to about 35 weight % of the E/X/Y copolymer and Y is in the range of 0 to about 50 weight % of the E/X/Y copolymer, and wherein the acid groups present in said ionomeric polymer are partially neutralized with a metal selected from the group consisting of zinc, sodium, lithium, calcium, magnesium, and combinations thereof.

In yet other more detailed features of the invention at least cover layers include an ionomeric polymer that comprises:
(a) an ionomeric polymer comprising one or more E/X/Y copolymers, wherein E is ethylene, X is a $C_3$ to $C_8$ α,β ethylenically unsaturated carboxylic acid, and Y is a softening comonomer selected from alkyl acrylate and alkyl methacrylate, wherein the alkyl groups have from 1 to 8 carbon atoms, or ionomers of such E/X/Y copolymers, wherein X is in the range of from about 5 to about 35 weight % of the E/X/Y copolymer and Y is in the range of from 0 to about 50 weight % of the E/X/Y copolymer, and wherein the acid groups present in said ionomeric polymer are partially neutralized with a metal selected from zinc, sodium, lithium, calcium, magnesium, and combinations thereof; or
(b) a bimodal ionomeric polymer comprising:
(i) a high molecular weight component having a weight average molecular weight, Mw, in the range of from about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers, wherein said high molecular weight component is partially neutralized with metal ions selected from lithium, sodium, zinc, calcium, magnesium, and combinations thereof, and
(ii) a low molecular weight component having a weight average molecular weight, Mw, in the range of from about 2,000 to about 30,000 and comprising one or more ethylene/α,β-ethylenically unsaturated $C_{3-8}$ carboxylic acid copolymers and/or one or more ethylene, alkyl(meth)acrylate, (meth)acrylic acid terpolymers, wherein said low molecular weight component is partially neutralized with metal ions selected from lithium, sodium, zinc, calcium, magnesium, and combinations thereof; or
(c) a modified ionomeric polymer comprising:
(i) a blend composition comprising:
ethylene,
from about 5 to about 25 weight percent (meth)acrylic acid (based on the total weight of said modified ionomeric polymer), and
from 0 to about 40 weight percent of a $C_1$ to $C_8$-alkyl acrylate (based on the total weight of said modified ionomeric polymer), and
from about 5 to about 45 weight percent (based on the total weight of said modified ionomeric polymer) of a fatty acid or one or more metal salts of a fatty acid, or
(ii) a bimodal polymer blend composition comprising:
a high molecular weight component having a weight average molecular weight, Mw, in the range of from about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers, wherein said high molecular weight component is partially neutralized with metal ions selected lithium, sodium, zinc, calcium, magnesium, and combinations thereof,
a low molecular weight component having a weight average molecular weight, Mw, in the range of from about 2,000 to about 30,000 and comprising one or more ethylene/α, β-ethylenically unsaturated $C_{3-8}$ carboxylic acid copolymers and/or one or more ethylene, alkyl(meth)acrylate, (meth)acrylic acid terpolymers, wherein said low molecular weight component is partially neutralized with metal ions selected from lithium, sodium, zinc, calcium, magnesium, and combinations thereof, and from about 5 to about 45 weight percent (based on the total weight of said modified ionomeric polymer) of a fatty acid or one or more metal salts of a fatty acid; or (d) a blend composition comprising the reaction product of:

(i) one or more ionomers, and (ii) a compound having a general formula $(R_2N)_m$—$R'$—$(X(O)_nOR_y)_m$, where R is selected from hydrogen, one or more $C_1$-$C_{20}$ aliphatic systems, one or more cycloaliphatic systems, one or more aromatic systems, and combinations thereof, R' is a bridging group comprising one or more unsubstituted $C_1$-$C_{20}$ straight chain or branched aliphatic or alicyclic groups, or one or more substituted straight chain or branched aliphatic or alicyclic groups, or one or more aromatic groups, or one or more oligomers each containing up to 12 repeating units, and wherein when X=C or S or P, m is 1-3, when X=C, n=1 and y=1, when X=S, n=2 and y=1, and when X=P, n=2 and y=2; or combinations of (a), (b), (c), and (d).

In yet other more detailed features, the composition of at least one cover layer comprises polymer selected from the group consisting of thermoplastic resins, thermoset resins, thermoplastic polyurethane, thermoset polyurethane, polyamide elastomer, thermoplastic copolyetherester block copolymer, thermoplastic copolyesterester block copolymer, polyethylene-octene, polyisoprene, 1,2-syndiotactic polybutadiene, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, and combinations thereof.

Styrenic block copolymer is a copolymer of styrene with either butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block.

In yet another more detailed feature, the composition of the cover layer comprises polyamide or copolymeric polyamide obtained by: condensation polymerization, ring-opening polymerization, addition polymerization, and polymer blending.

In one preferred embodiment, the cover layers comprise the polyalkenamer/functionalized organic modifier compositions described herein. In certain embodiments, the polyalkenamer/functionalized organic modifier composition is the majority ingredient in the cover layer, and may, for instance, constitute at least 90, more particularly 95, wt % of the cover layer.

Since the inventive compositions disclosed herein contain ionic groups and crosslinked structure, disclosed golf balls having a cover layer made from the compositions provide excellent shear durability from the ionic cluster and crosslinked structure.

Method of Making the Golf Balls

The polyalkenamer/functionalized organic modifier composition can be formed by any mixing method. The polyalkenamer/functionalized organic modifier composition can be processed by any method such as profile-extrusion, pultrusion, extrusion, compression molding, transfer molding, injection molding, cold-runner molding, hot-runner molding, reaction injection molding or any combination thereof. The polyalkenamer/functionalized organic modifier composition can be a blend of polyalkenamer and functionalized organic modifier that is not subjected to any further crosslinking or curing, a blend that is subjected to crosslinking or curing; a blend that forms a semi- or full-interpenetrating polymer network (IPN) upon crosslinking or curing, or a thermoplastic vulcanizate blend. The composition can be crosslinked by any crosslinking method(s), such as, for example, applying thermal energy, irradiation, e-beam radiation, or a combination thereof, as explained in more detail above. The crosslinking reaction can be performed during any processing stage, such as extrusion, compression molding, transfer molding, injection molding, post-curing, or a combination thereof. In one embodiment, the ability of the polyalkenamer/functionalized organic modifier compositions to be injection molded and cured either subsequently by compression molding or actually during the injection molding process itself provides considerable flexibility in manufacture of the individual golf ball components.

For instance, the polyalkenamer/functionalized organic modifier compositions including crosslinking agents, fillers and the like can be mixed together with or without melting them. Dry blending equipment, such as a tumble mixer, V-blender, ribbon blender, or two-roll mill, can be used to mix the compositions. The golf ball compositions can also be mixed using a mill, internal mixer such as a Banbury or Farrel continuous mixer, extruder or combinations of these, with or without application of thermal energy to produce melting. The various components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide selected. The molding cycle may have a single step of molding the mixture at a single temperature for fixed time duration.

For example one mode of preparation for the cores of the golf balls that comprise the polyalkenamer/functionalized organic modifier composition is to first mix the various core ingredients on a two-roll mill or by extrusion to form slugs of approximately 30-45 g and then compression mold in a single step at a temperature between 150 to 210° C. for times between 2 and 20 minutes (or 2 and 12 minutes), to both form the core and cure the polyalkenamer/functionalized organic modifier composition.

Alternatively, the core may be formed by first injection molding the polyalkenamer/functionalized organic modifier composition into a mold followed by a subsequent compression-molding step to complete the curing step. The curing time and conditions in this step would depend on the formulation of the polyalkenamer/functionalized organic modifier composition.

Alternatively, the core may be formed from the polyalkenamer/functionalized organic modifier composition in a single injection molding step in which the polyalkenamer/functionalized organic modifier composition is injection molded into a heated mold at a sufficient temperature to effect either partially of fully crosslinking the material to yield the desired core properties. If the material is partially cured, additional compression molding or irradiation steps may optionally be employed to complete the curing process to yield the desired core properties.

Similarly in both intermediate layer(s) and outer cover formation, the use of polyalkenamer/functionalized organic modifier compositions allows for considerable flexibility in the layer formation steps of golf ball construction.

For instance, finished golf balls may be prepared by initially positioning a solid preformed core in an injection-molding cavity followed by uniform injection of the intermediate or cover layer polyalkenamer/functionalized organic modifier composition sequentially over the core, to produce layers of the required thickness and ultimately golf balls of the required diameter. Again use of a heated injection mold allows the temperature to be controlled sufficient to either partially of fully crosslink the material to yield the desired layer properties. If the material is partially cured, additional compression molding or irradiation steps may optionally be employed to complete the curing process to yield the desired layer properties.

Alternatively, the intermediate and/or cover layers may also be formed around the core or intermediate layer by first forming half shells by injection molding the polyalkenamer rubber/functionalized organic modifier compositions followed by a compression molding the half shells about the core or intermediate layer to effect the curing of the layers in the final ball.

Alternatively, the intermediate and/or cover layers may also be formed around the core or intermediate layer by first forming half shells by injection molding the polyalkenamer/functionalized organic modifier compositions, again using a heated injection mold which allows the temperature to be controlled sufficient to either partially or fully crosslink the material to yield the desired half shell properties layer properties. The resulting fully or partially cured half shells may then be compression molded around the core or core plus intermediate layer. Again, if the half shell is partially cured, the additional compression molding or irradiation steps may optionally be tailored to complete the curing process to yield the desired layer properties.

Finally, outer or intermediate covers comprising the polyalkenamer/functionalized organic modifier compositions may also be formed around the cores using conventional compression molding techniques. Cover materials for compression molding may also be extruded or blended resins or castable resins.

In addition, if radiation is used as a cross-linking agent, then the mixture comprising the unsaturated polymer and other additives can be irradiated following mixing, during forming into a part such as the core, intermediate layer, or outer cover of a ball, or after forming such part.

The use of the novel blend compositions in the various components of a golf ball such as the core, intermediate layers and/or covers allows for increases in COR and modulus in the materials of construction while also improving the materials processability.

In view of the many possible embodiments to which the principles of the disclosed compositions and methods, it should be recognized that the illustrated embodiments are only preferred examples and should not be taken as limiting the scope of the invention.

EXAMPLES

Examples of the invention are given below by way of illustration and not by way of limitation.

The properties of C.O.R., Shore D hardness (measured on both the material and on the resulting spheres) were conducted using the test methods as defined below.

Core or ball diameter was determined by using standard linear calipers or size gauge.

Compression was measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

Thus, a Riehle compression of 100 would be the same as an Atti compression of 60.

Initial velocity of a golf ball after impact with a golf club is governed by the United States Golf Association ("USGA"). The USGA requires that a regulation golf ball can have an initial velocity of no more than 250 feet per second±2% or 255 feet per second. The USGA initial velocity limit is related to the ultimate distance that a ball may travel (280 yards±6%), and is also related to the coefficient of restitution ("COR"). The coefficient of restitution is the ratio of the relative velocity between two objects after direct impact to the relative velocity before impact. As a result, the COR can vary from 0 to 1, with 1 being equivalent to a perfectly or completely elastic collision and 0 being equivalent to a perfectly plastic or completely inelastic collision. Since a ball's COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec (for the tests used herein the velocity was 125 ft/sec). As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

Shore D hardness was measured in accordance with ASTM Test D2240.

|  | Ex 1 | Ex 2 | Ex 3 | Ex 4 | Comp Ex 1 | Comp Ex 2 | Comp Ex 3 | Comp Ex 4 |
|---|---|---|---|---|---|---|---|---|
| Vestenamer 8012[1] | 100 | 100 | 100 | 100 | 100 | 100 | 100 | 100 |
| LIR-410[2] (pph*) | 5 | 5 | 5 | 5 |  |  |  |  |
| ZDA12[3] (pph*) | 43 | 65 | 87 | 109 | 43 | 65 | 87 | 109 |
| Varox[4] (pph*) | 1.1 | 1.1 | 1.1 | 1.1 | 1.1 | 1.1 | 1.1 | 1.1 |
| Sphere physicals |  |  |  |  |  |  |  |  |
| Compression (PGA) | 47 | 95 | 127 | 137 | 35 | 95 | 125 | 143 |
| COR (125 ft/sec) | 0.776 | 0.801 | 0.817 | 0.822 | 0.767 | 0.806 | 0.82 | 0.827 |
| Shore D | 42.6 | 52.3 | 61.7 | 65.4 | 39.4 | 45 | 54.4 | 58.7 |
| Specific Gravity | 1.07 | 1.11 | 1.14 | 1.17 | 1.06 | 1.1 | 1.14 | 1.17 |

*based on 100 parts Vestenamer
[1]Polyoctenamer available from Evonik.
[2]LIR 410 carboxylated polyisoprene from Septon.
[3]Zinc diacryalte available JINYANG Chemical Co.
[4]Varox is a 3:1 ratio by weight of Luperox 231XL and Lupeox 130XL both available from Arkema Corp.

Analysis of the Comparative Examples shows that an in increase in ZDA concentration results in an increase in hardness. Comparison of Ex 1 with Comp Ex 1 and Ex 2 with Comp Ex 2, and Ex 3 with Comp Ex 3, and Ex 4 with Comp Ex 4 shows that for the same ZDA levels, hardness can be increased independent of ZDA concentration.

What is claimed is:

1. A composition comprising a reaction product of:
   (a) a polyalkenamer; and
   (b) an organic modifier that includes a urethane containing unsaturated polymer or is selected from a carboxyl-terminated polybutadiene, an amine-terminated polybutadiene, a hydroxyl-terminated polybutadiene, an isocyanate-terminated polybutadiene, a carboxyl-functionalized polyisoprene, a hydrogenated liquid isoprene rubber functionalized with at least one moiety selected from the group consisting of carboxyl, hydroxyl, amino, epoxy, (meth)acrylate, vinyl, ester, isocyanate, carbonyl, urethane, anhydride or a metal salt thereof; and
   (c) a crosslinking agent; and
   (d) a co-crosslinking agent comprising an unsaturated fatty acid having from about 3 to about 8 carbon atoms, or a metal salt thereof.

2. The composition of claim 1, wherein the polyalkenamer is a polyoctenamer.

3. The composition of claim 1, wherein the organic modifier is a carboxyl-functionalized polybutadiene or carboxyl-functionalized polyisoprene or a metal salt thereof.

4. The composition of claim 1, wherein the metal salt includes a metal cation selected from $Li^+$, $Na^+$, $K^+$, $Zn^{2+}$, $Ca^{2+}$, $Co^{2+}$, $Ni^{2+}$, $Cu^{2+}$, $Pb^{2+}$, $Mg^+$ or a mixture thereof.

5. The composition of claim 1, wherein the reaction product is prepared via thermal energy, e-beam radiation, gamma-radiation, irradiation, or a combination thereof.

6. The composition of claim 1 wherein the organic modifier is partially hydrogenated.

7. The composition of claim 1, wherein the crosslinking agent comprises zinc oxide, sulfur, sulfur compounds, organic peroxide, zinc peroxide, azo compounds, magnesium oxide, benzothiazole sulfenamide accelerator, benzothiazyl disulfide, phenolic curing resin, m-phenylene bis-maleimide, thiuram disulfide, dipentamethylene-thiuram hexasulfide, or a mixture thereof.

8. The composition of claim 1 wherein the composition comprises from about 5 to about 70 wt % of polyalkenamer, based on the combined weight of components (a) and (b).

9. A sports equipment article comprising the composition of claim 1 wherein the sports equipment article is selected from a recreation ball, a golf club or component thereof, running shoes, walking shoes, golf shoes, glove, grips, helmet, protective gear, bicycle, ski, and a skate.

10. The composition of claim 1, wherein the organic modifier is a metal salt of carboxyl-terminated polybutadiene or a metal salt of a carboxyl-functionalized polyisoprene, and wherein the reaction product is a crosslinked ionomer.

11. The composition of claim 1, wherein the co-crosslinking agent comprises a zinc salt of acrylic acid or a zinc salt of methacrylic acid.

12. A method for making a composition comprising reacting together:
   (a) a polyalkenamer; and
   (b) an organic modifier that includes a urethane containing unsaturated polymer or is selected from a carboxyl-terminated polybutadiene, an amine-terminated polybutadiene, a hydroxyl-terminated polybutadiene, an isocyanate-terminated polybutadiene, a carboxyl-functionalized polyisoprene, a hydrogenated liquid isoprene rubber functionalized with at least one moiety selected from the group consisting of carboxyl, hydroxyl, amino, epoxy, (meth)acrylate, vinyl, ester, isocyanate, carbonyl, urethane, anhydride or a metal salt thereof; and (c) a crosslinking agent; and (d) a co-crosslinking agent comprising an unsaturated fatty acid having from about 3 to about 8 carbon atoms, or a metal salt thereof.

13. The method of claim 12, wherein the polyalkenamer is a polyoctenamer and the organic modifier is a carboxyl-functionalized polybutadiene or carboxyl-functionalized polyisoprene or a metal salt thereof.

14. The method of claim 12, wherein the organic modifier is a metal salt of carboxyl-terminated polybutadiene or a metal salt of a carboxyl-functionalized polyisoprene, and wherein the reaction product is a crosslinked ionomer.

15. The method of claim 12, wherein the organic modifier is a carboxyl-functionalized polybutadiene or a carboxyl-functionalized polyisoprene, and the method comprises mixing the polyalkenamer with the organic modifier and subsequently neutralizing the carboxyl moiety of the organic modifier with a metal cation.

16. A golf ball comprising:
(i) a core;
(ii) and at least one additional layer,
wherein at least one of the core or the at least one additional layer comprises a reaction product of:
(a) a polyalkenamer; and
(b) an organic modifier that includes a urethane containing unsaturated polymer or is selected from a carboxyl-terminated polybutadiene, an amine-terminated polybutadiene, a hydroxyl-terminated polybutadiene, an isocyanate-terminated polybutadiene, a carboxyl-functionalized polyisoprene, a hydrogenated liquid isoprene rubber functionalized with at least one moiety selected from the group consisting of carboxyl, hydroxyl, amino, epoxy, (meth)acrylate, vinyl, ester, isocyanate, carbonyl, urethane, anhydride or a metal salt thereof; and
(c) a crosslinking agent; and
(d) a co-crosslinking agent comprising an unsaturated fatty acid having from about 3 to about 8 carbon atoms, or a metal salt thereof.

17. A golf ball comprising:
(i) a core;
(ii) at least one intermediate layer; and
(iii) at least one cover layer,
wherein at least one of the core, the at least one intermediate layer or cover layer comprises a reaction product of:
(a) a polyalkenamer; and
(b) an organic modifier that includes a urethane containing unsaturated polymer or is selected from a carboxyl-terminated polybutadiene, an amine-terminated polybutadiene, a hydroxyl-terminated polybutadiene, an isocyanate-terminated polybutadiene, a carboxyl-functionalized polyisoprene, a hydrogenated liquid isoprene rubber functionalized with at least one moiety selected from the group consisting of carboxyl, hydroxyl, amino, epoxy, (meth)acrylate, vinyl, ester, isocyanate, carbonyl, urethane, anhydride or a metal salt thereof; and
(c) a crosslinking agent; and
(d) a co-crosslinking agent comprising an unsaturated fatty acid having from about 3 to about 8 carbon atoms, or a metal salt thereof.

18. The golf ball of claim 17, wherein the reaction product is a majority ingredient in the respective core, intermediate layer or cover layer.

19. A golf ball comprising:
(i) a core;
(ii) at least one intermediate layer; and
(iii) at least one cover layer,
wherein at least one of the core, the at least one intermediate layer, or the at least one cover layer comprises a reaction product of:
(a) a polyalkenamer;
(b) an organic modifier selected from a carboxyl-terminated polybutadiene, an amine-terminated polybutadiene, a hydroxyl-terminated polybutadiene, an isocyanate-terminated polybutadiene, a carboxyl-functionalized polyisoprene, a hydrogenated liquid isoprene rubber functionalized with at least one moiety selected from the group consisting of carboxyl, hydroxyl, amino, epoxy, (meth)acrylate, vinyl, ester, isocyanate, carbonyl, urethane, anhydride, or a metal salt thereof;
(c) a crosslinking agent; and
(d) a co-crosslinking agent.

20. The golf ball of claim 19, wherein the co-crosslinking agent comprises an unsaturated fatty acid having from about 3 to about 8 carbon atoms, or a metal salt thereof.

21. The golf ball of claim 20, wherein the co-crosslinking agent comprises a zinc salt of acrylic acid or a zinc salt of methacrylic acid.

* * * * *